United States Patent [19]

Wolfberg et al.

[11] Patent Number: 4,885,685

[45] Date of Patent: Dec. 5, 1989

[54] INVESTMENT MANAGEMENT SYSTEM WITH TRAVEL USAGE FUNDS INDEXED TO CUSTOMER ACCOUNT STATUS

[75] Inventors: Larry Wolfberg, Honolulu, Hi.; Brent Wolfberg, Los Angeles, Calif.; Jan E. Rhoads, Virginia Beach, Va.

[73] Assignee: L & C Family Partnership, Honolulu, Hi.

[21] Appl. No.: 98,631

[22] Filed: Sep. 18, 1987

[51] Int. Cl.[4] .............................................. G06F 15/30
[52] U.S. Cl. ..................................... 364/401; 364/408
[58] Field of Search .......................... 364/401, 406, 408

[56] References Cited

U.S. PATENT DOCUMENTS

| | | | |
|---|---|---|---|
| 3,697,693 | 10/1972 | Deschenes et al. | 364/408 X |
| 4,648,037 | 3/1987 | Valentino | 364/408 |
| 4,694,397 | 9/1987 | Grant et al. | 364/408 |
| 4,742,457 | 5/1988 | Leon et al. | 364/408 |
| 4,752,877 | 6/1988 | Roberts et al. | 364/408 |

Primary Examiner—Clark A. Jablon
Attorney, Agent, or Firm—Nixon & Vanderhye

[57] ABSTRACT

A data processing system is disclosed which tracks each client's cumulative travel usage over time for the purpose of authorizing travel requests and ensuring a predetermined minimum return on an initial investment base. Such variables as frequency of use and level of service (i.e., first class, coach, etc.) are translated into cumulative cost figures which are carefully tracked and compared with a "travel ceiling." This ceiling is actually a constantly varying reference base line of maximum expanditures/usage available to the client at any given time to stay on course to achieve an expected return on the initial investment. The air travel related data is stored in uniquely formatted client account files which may be readily accessed and displayed. The data processing system's ability to track many travel related conditions is enhanced by a unique set of control status words which control software flow and which are utilized to visually flag important status conditions.

74 Claims, 26 Drawing Sheets

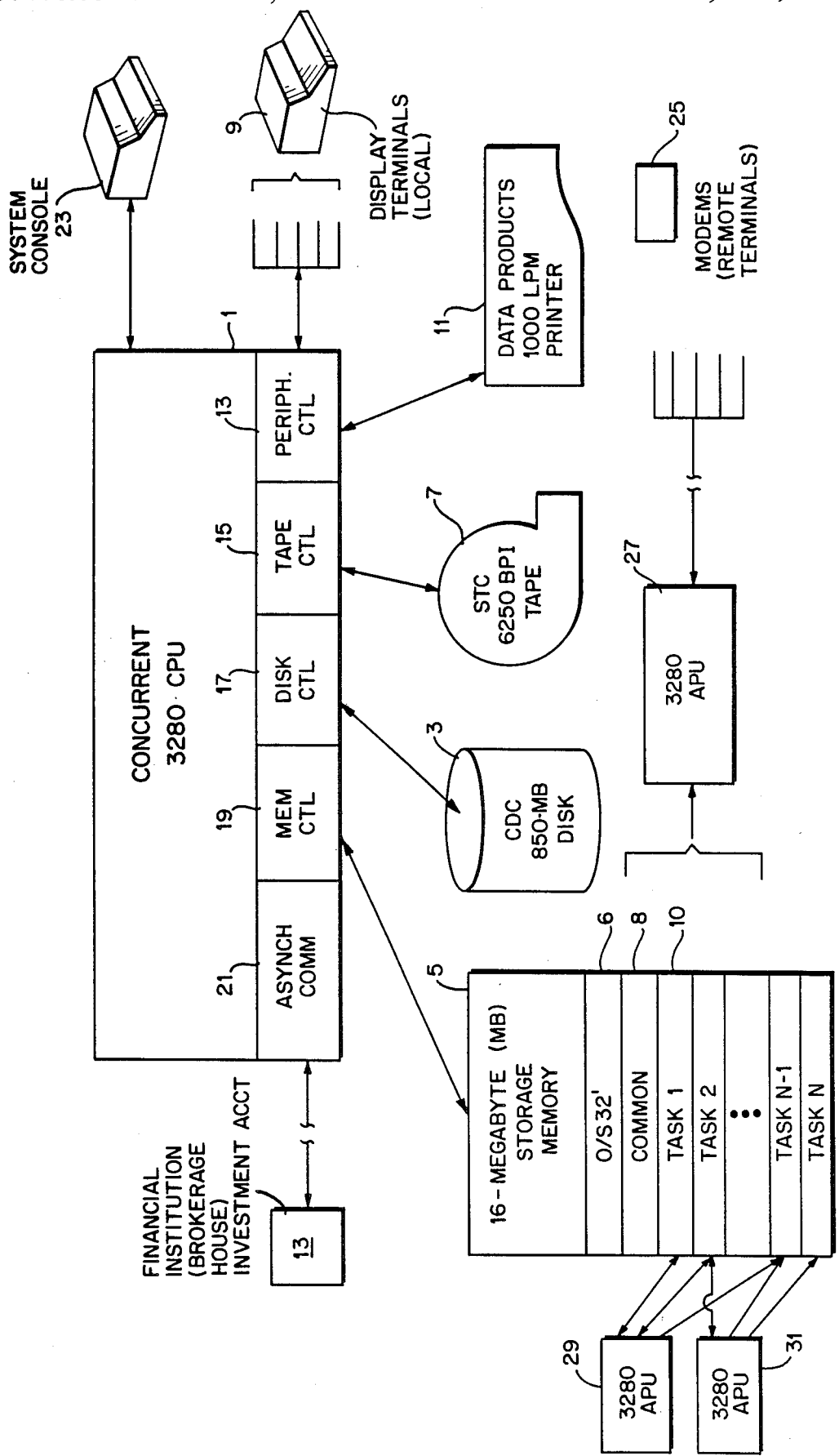

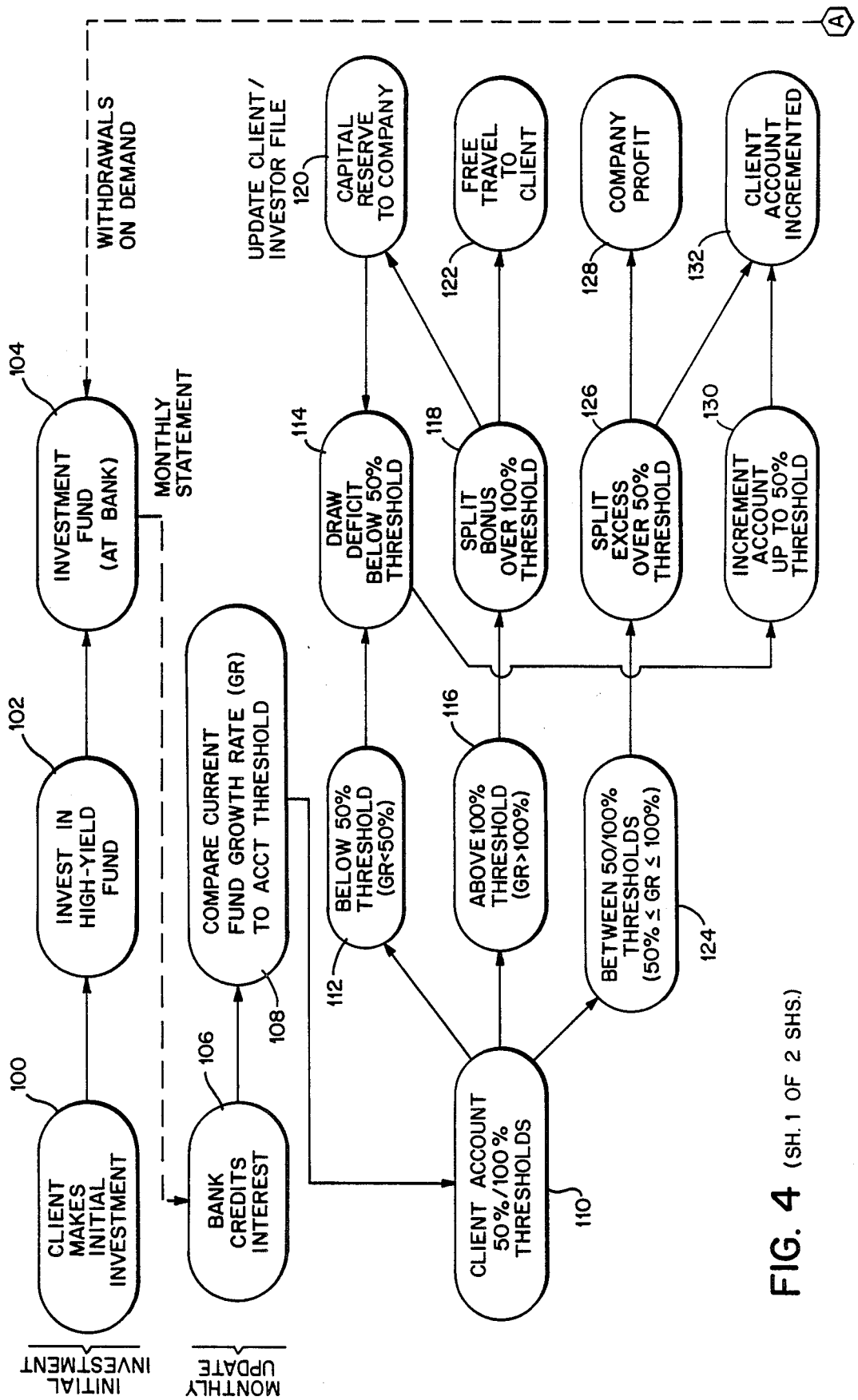
FIG. 4 (SH. 1 OF 2 SHS.)

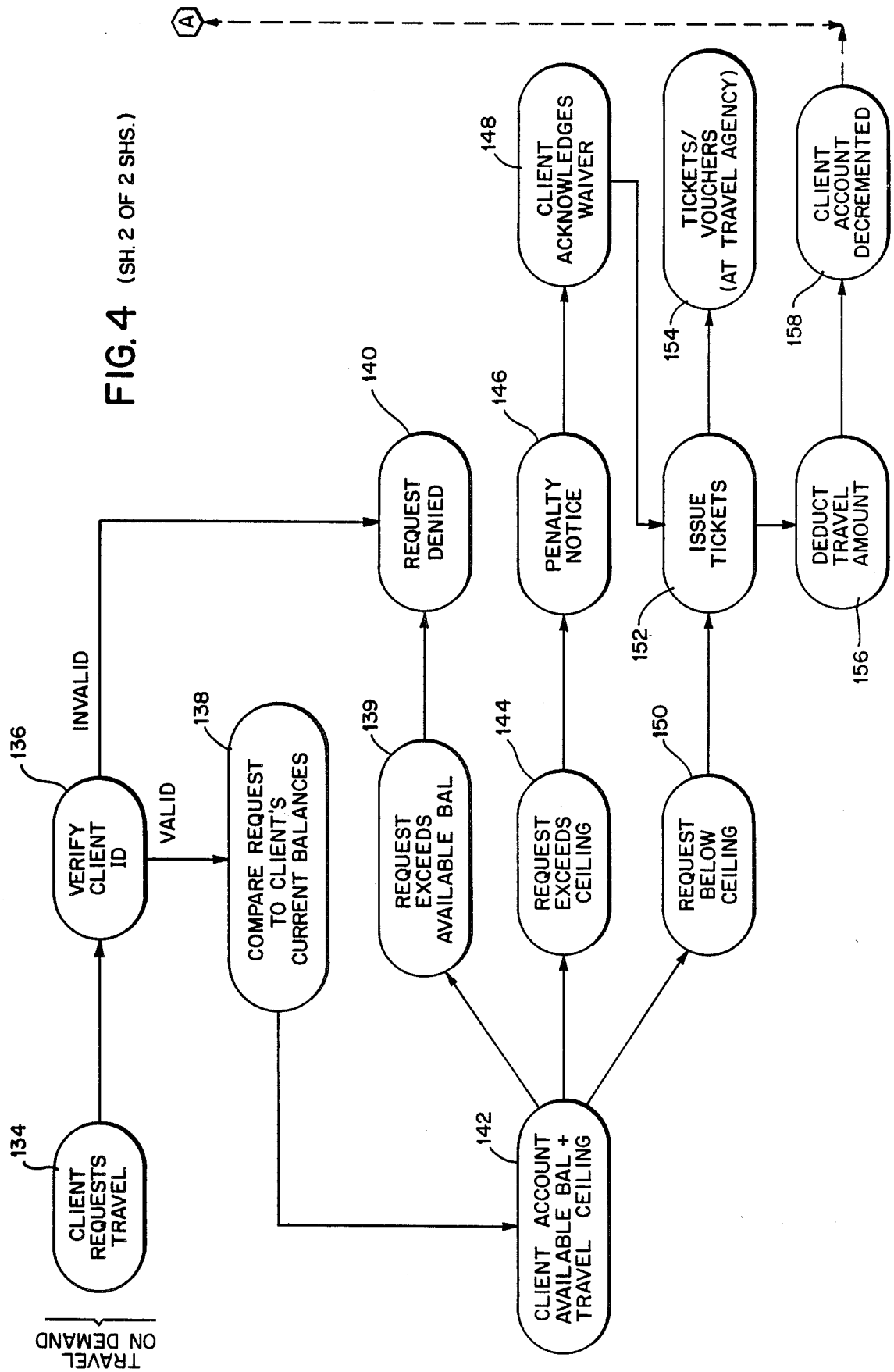
FIG. 4 (SH. 2 OF 2 SHS.)

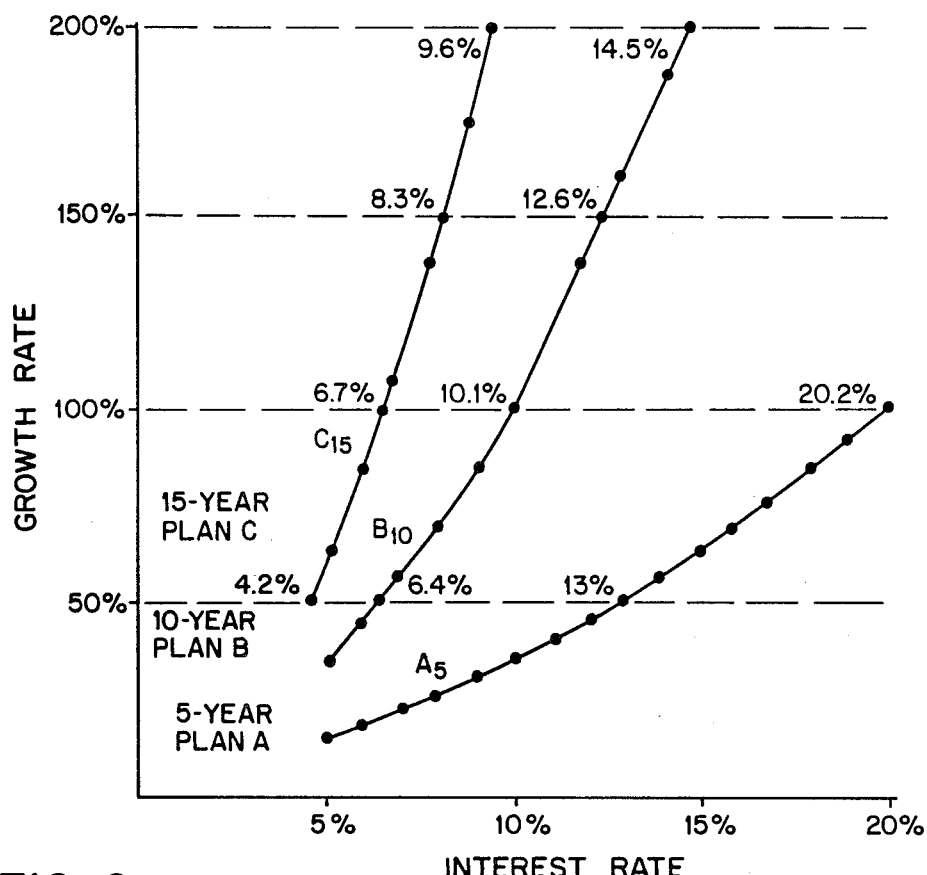
FIG. 6
FIG. 7
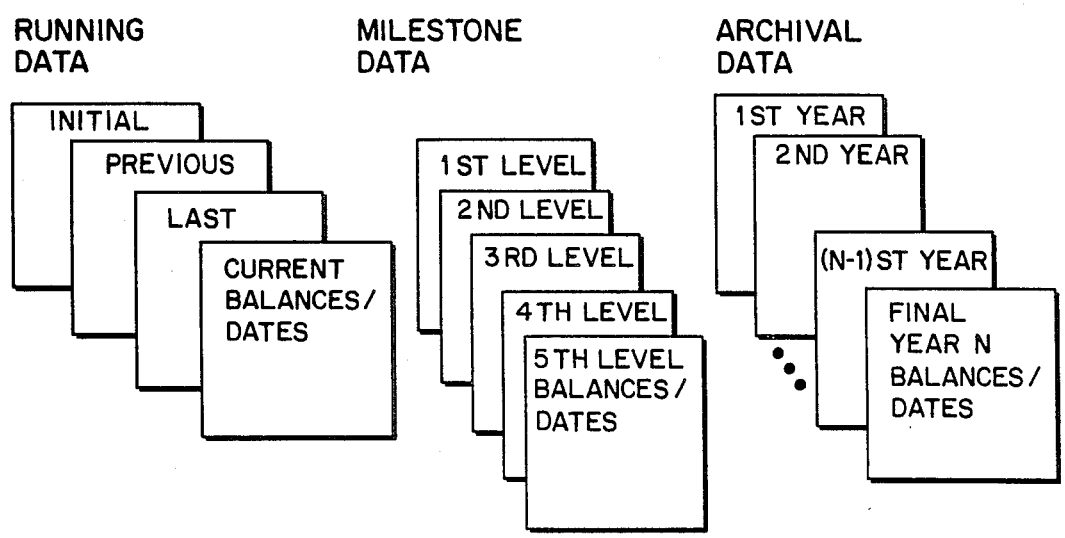

FIG. 8A
(SH 1 OF 2 SHS)

CLIENT ACCOUNT FORMAT

- REPORT: TITLE / DATE / PERIOD COVERED
- CLIENT: ACCOUNT # / ID # / NAME / ADDRESS / INITIAL PLAN / INITIAL BAL / LAST ACTIVITY
- STATUS: CURRENT STATES OF CONTROL STATUS WORDS (CSW's) FOR ACCOUNT / VESTING / BONUS / PENALTY / IDENT
- RATES: GROWTH RATE / LIMITS (CURRENT %) (YTD MIN / MAX %) / INTEREST RATE / LIMITS (CURRENT %) (YTD MIN / MAX %)
- THRESHOLDS: (DBAL) DECLINING BAL / DATE (CURRENT / TARGET) — 50% — 100% — 150% — 200%
- (VBAL) VESTING BAL / DATE (CURRENT / UPDATE) — PENALTY UNDER 50% — SPLIT 50-100% — BONUS 100-150% — EXCESS 150-200%
- BALANCES: (CBAL) COMPANY BAL / DATE (CURRENT / UPDATE) — DEFICIT — SPLIT — BONUS — RESERVE
- CURRENT TRANSACTIONS (ONLY MOST RECENT 5 TRANSACTIONS ARE LISTED)
- TRANSACTION DATA    TRAVEL DATA    TRAVEL CHARGES

① MOST RECENT TRIP

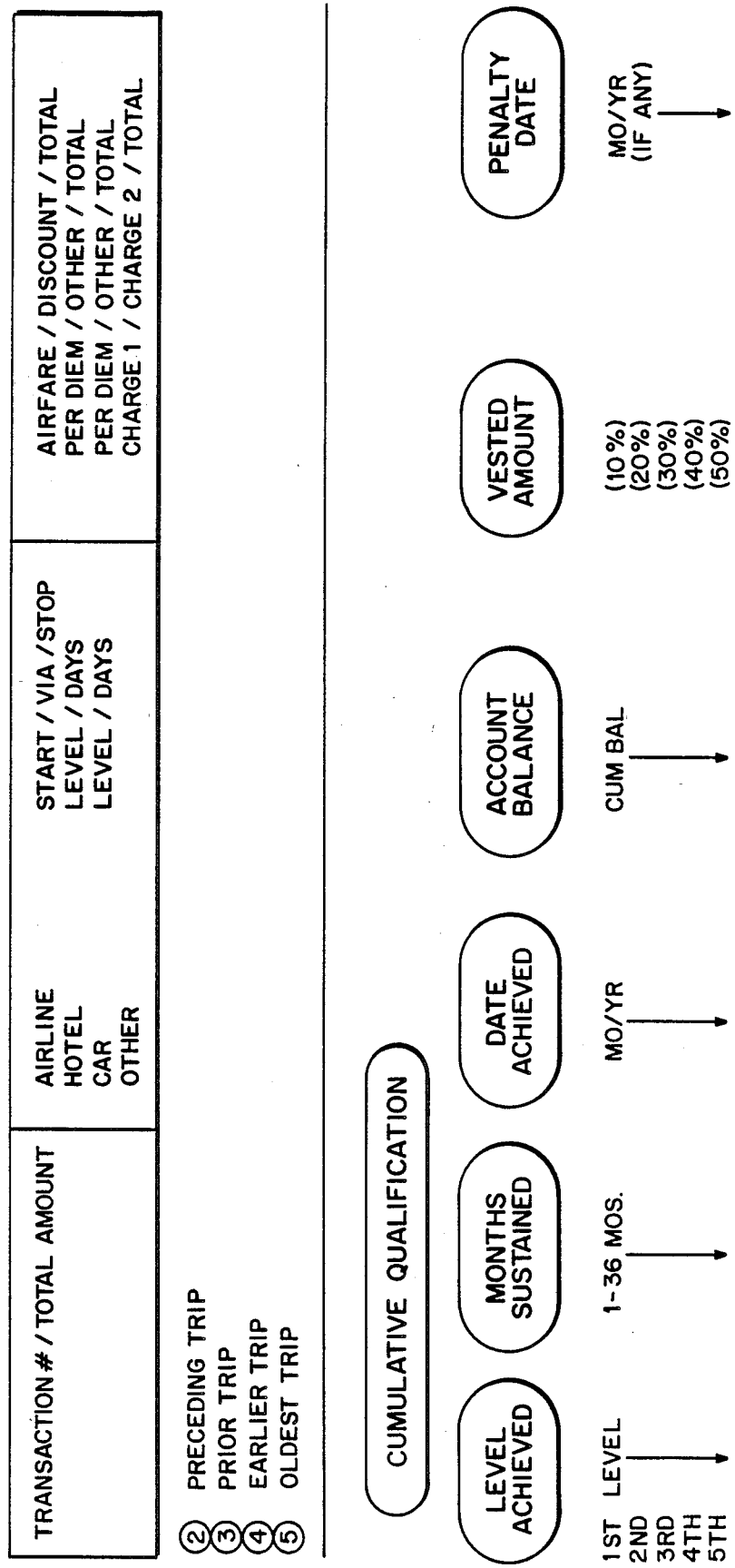
FIG. 8A (SH 2 OF 2 SHS)

INVESTMENT ACCOUNT FORMAT

- REPORT — TITLE / DATE / PERIOD COVERED (CURRENT MONTH)
- BANK — INVESTMENT ACCOUNT #'s / NAME / ADDRESS / ETC.
- RATES — GROWTH RATE / LIMITS ............................. / INTEREST RATE / LIMITS
- BALANCES (FROM BELOW)
  - INVESTMENT ACCT (CURRENT/LAST/Δ%) / VESTING ACCT (CURRENT/LAST/Δ%) / COMPANY ACCT (CURRENT/LAST/Δ%) / YEAR-TO-DATE INTEREST (INVESTMENT/CLIENT/COMPANY/AVG %)
  - (CURRENT / LAST / Δ%) (YEAR-TO-DATE MIN / MAX %) ... (CURRENT / LAST / Δ%) (YEAR-TO-DATE MIN / MAX %)

CLIENT SUMMARY RECORDS

| ACCT # | NAME / START DATE (MO/YR) | INIT PLAN/BAL (A/B/C) | STATUS (Y/B/P/I/S/C) | VESTING LEVEL 0–5 | QUALIFICATION LEVEL | GROWTH RATE 0–200% | DECLINING BALANCE $D BAL |
|---|---|---|---|---|---|---|---|
| 1 | A | → | → | → | | → | → |
| 2 | B | | | | | | |
| 3 | C | | | | | | |
| XXX | N | | | | | | |

FIG. 10A (SH 1 OF 2)
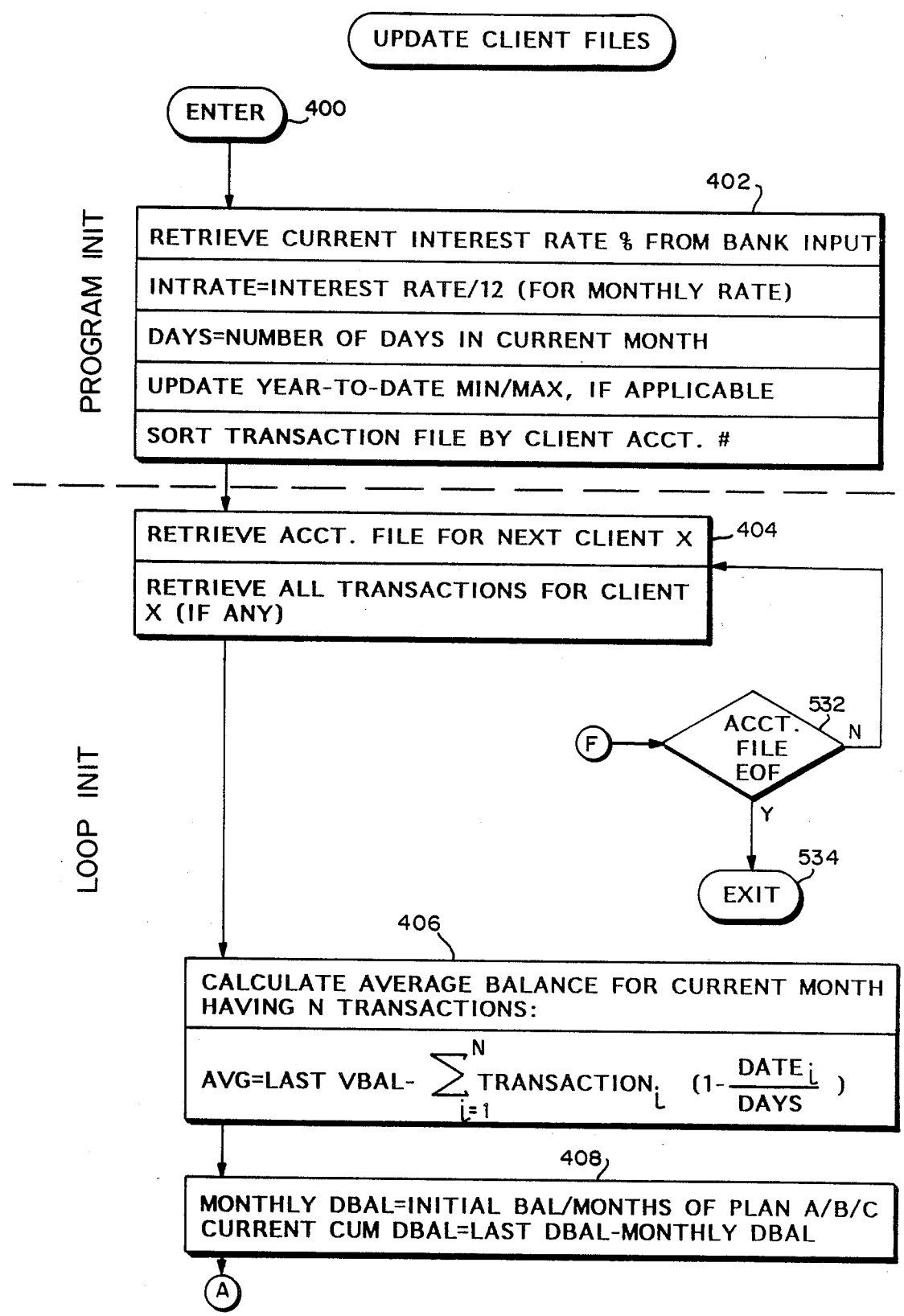

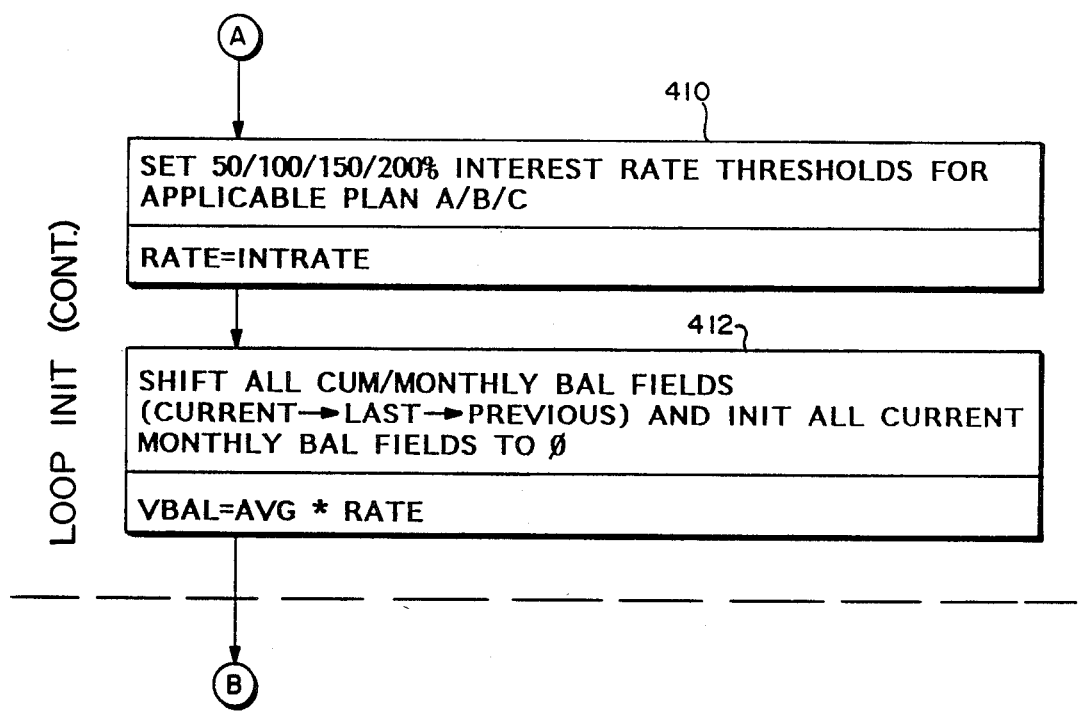
FIG. 10A (SH 2 OF 2)

UPDATE CLIENT
(SH 1 OF 3)

(SH. 2 OF 3)

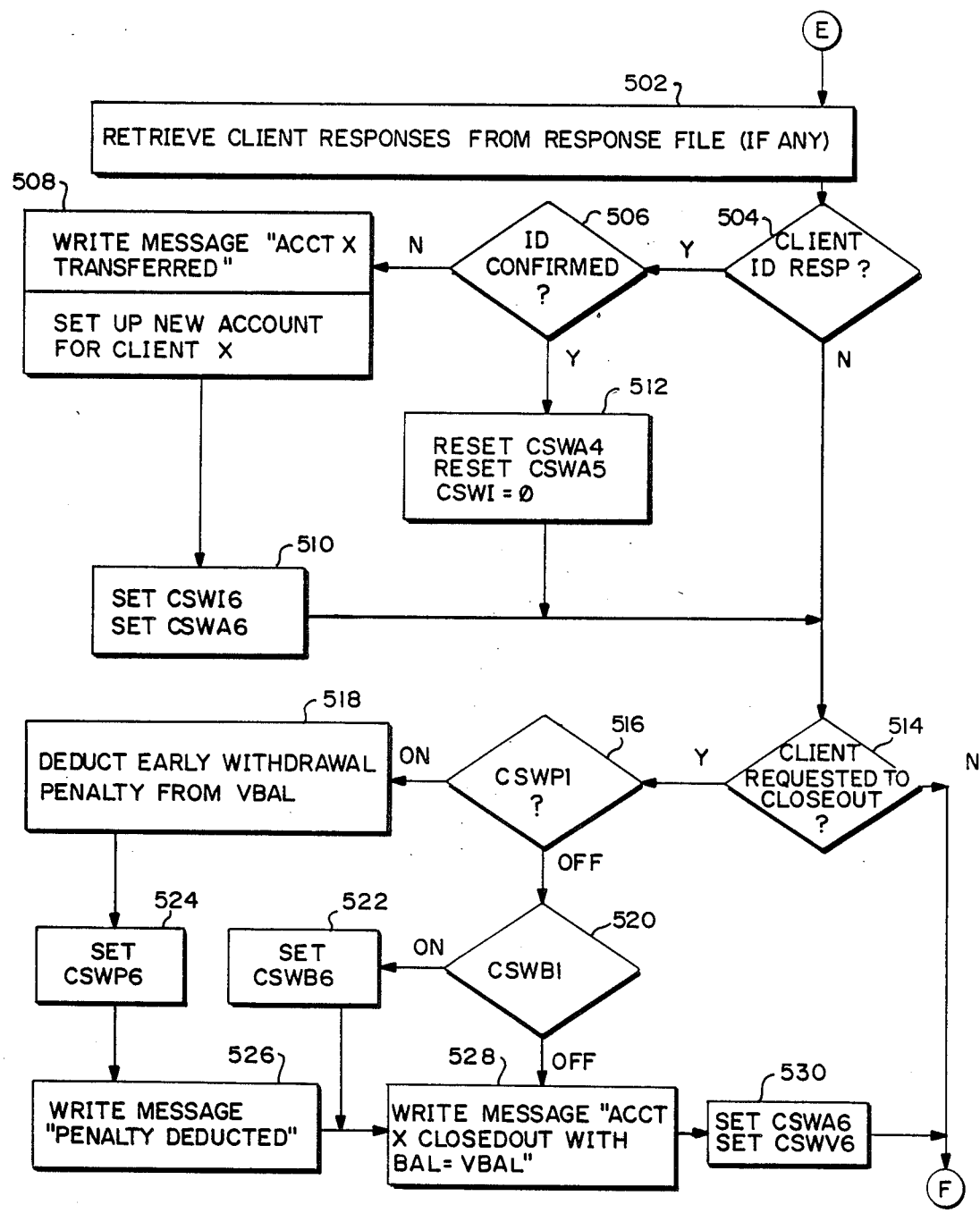
FIG. 10C (SH 3 OF 3)

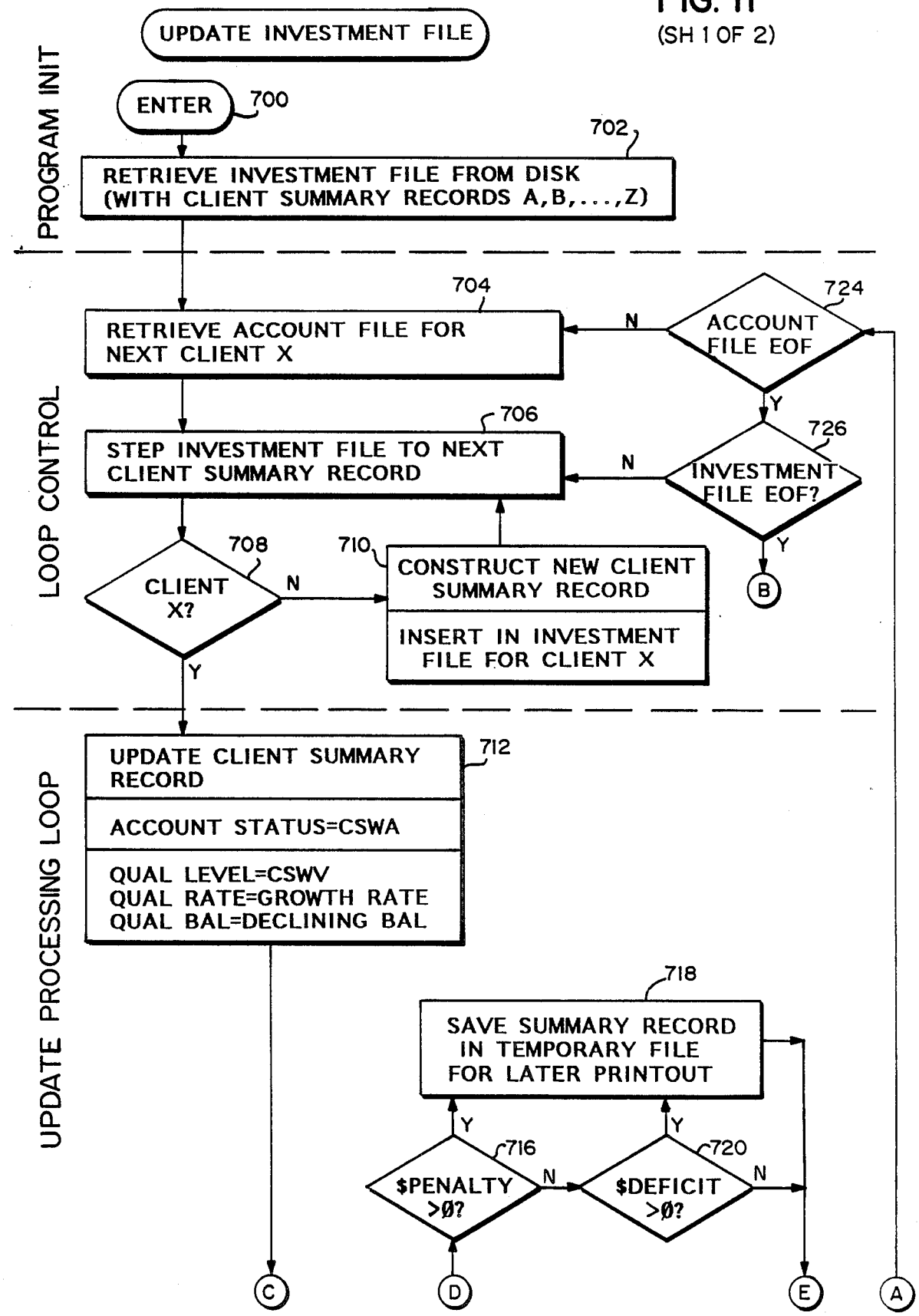

(SH. 2 OF 2)

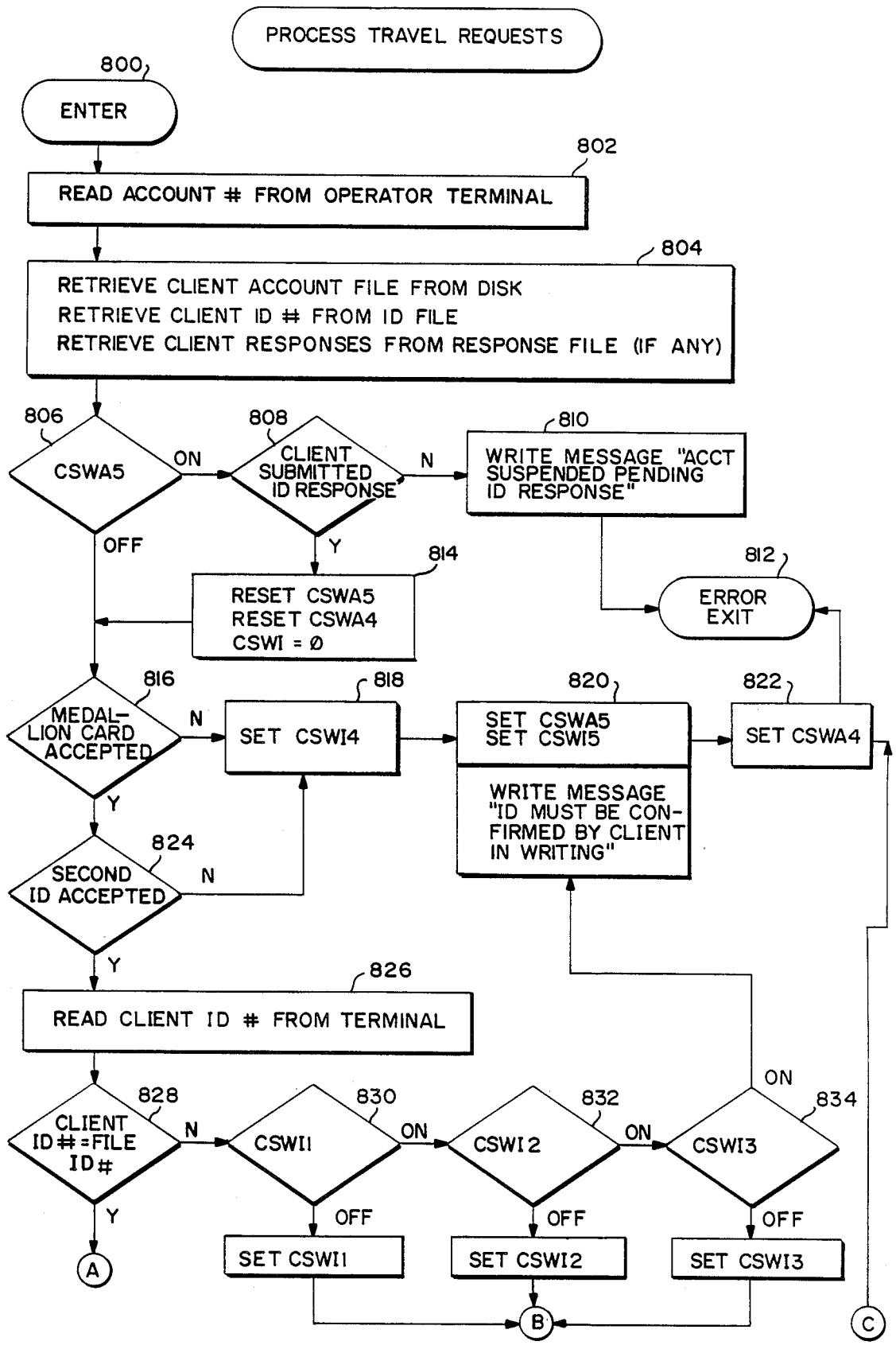
FIG.12 (SH. 1 OF 5)

FIG. 12 (SH. 2 OF 5)
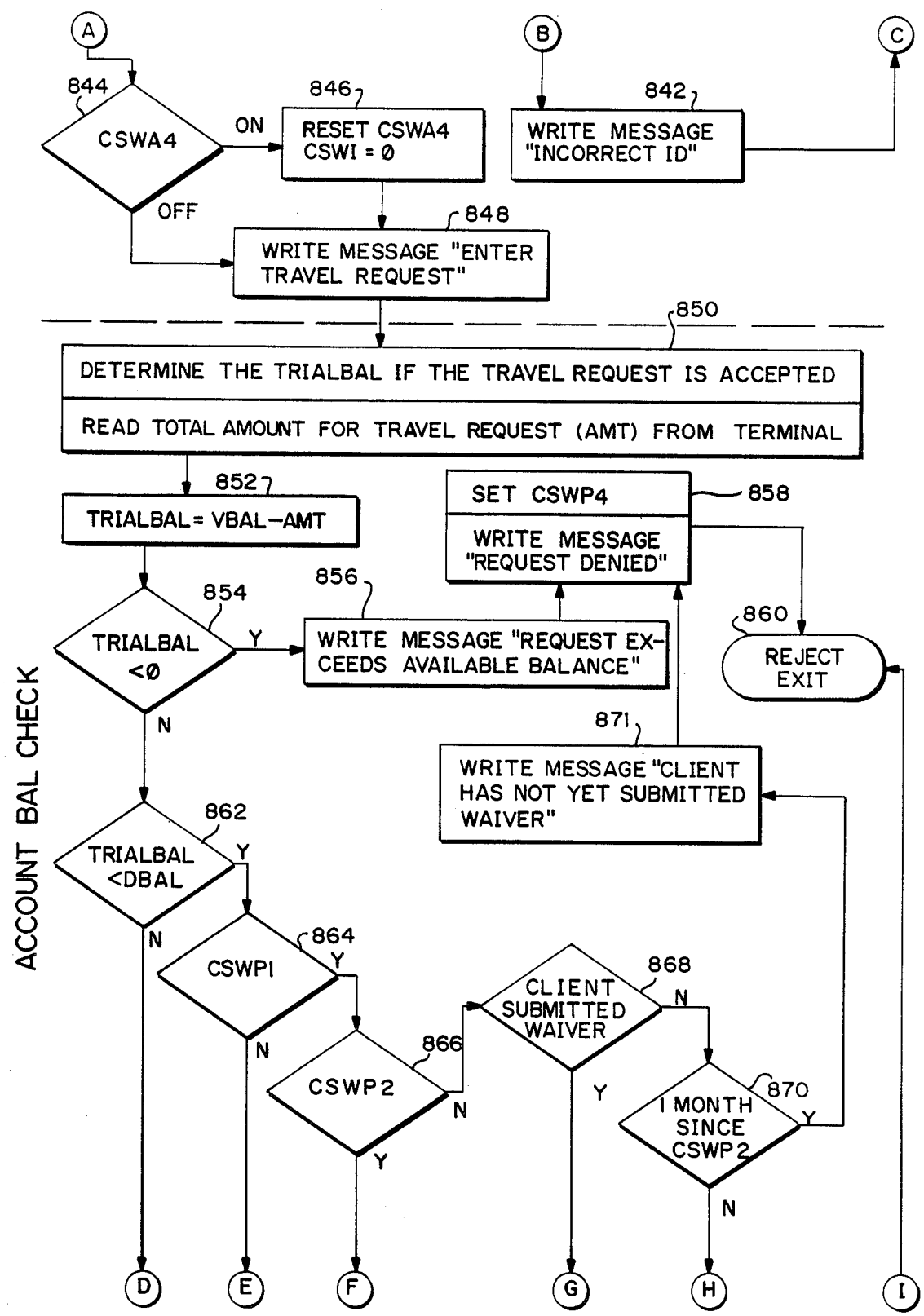

INVESTMENT MANAGEMENT SYSTEM WITH TRAVEL USAGE FUNDS INDEXED TO CUSTOMER ACCOUNT STATUS

FIELD OF THE INVENTION

The invention generally relates to an improved data processing method and apparatus for travel and financial service task management. More particularly, the invention relates to a data processing system which manages and monitors participant's air travel use over time while tracking and monitoring the growth of a participant's investment base which varies as a function of travel service use and investment performance.

BACKGROUND AND SUMMARY OF THE INVENTION

Data processing systems have heretofore been utilized by the travel services community for air and hotel reservations for both the infrequent traveller and the traveller whose business needs dictate nearly continuous travel. The airlines, through their frequent flyer programs, cater to the special needs of the business community and utilize data processing systems to monitor travel usage to accurately track the benefits which accrue to the frequent traveller.

Such data processing systems monitored clients' travel usage over time at most to only a very limited extent. For example, an airline reservation data processing system typically does not monitor a client's travel usage over time at all. Although the frequent flyer related data processing systems monitor travel usage to a limited extent, such systems do not, for example, monitor a participant's cumulative travel usage over a predetermined time while analyzing frequency of use and cost of travel variables to authorize or deny travel request. Moreover, none of these data processing systems monitor and control a client's travel usage as a function of a client's carefully monitored investment base.

Prior art financial management data processing systems are typically first utilized when a client delivers funds to a brokerage house for investment. For example, the securities brokerage-cash management system described in U.S. Pat. No. 4,326,422, while monitoring and controlling a wide range of investments is concerned solely with a data processing system whose action is initiated when an investor directs funds to the cash management system.

The present invention, besides operating in a manner totally distinct from the aforementioned travel monitoring data processing systems and the system described in U.S. Pat. No. 4,346,442, uniquely combines data processing activities that are not normally associated with each other. In this regard, the present invention monitors the growth of a participant's travel services investment account and performs required reservation and ticket purchasing tasks. In doing this, the invention further tracks the cumulative usage of travel services of each participant as a function of the cumulative growth of the participant's initial investment to ensure that the travel services utilized remain within the constraints built into the system. If the services remain within system constraints, the participant is ensured of receiving at least a predetermined minimum return on his initial investment base. As will be explained in further detail below, the system constraints serve to provide the participant with a predetermined guaranteed investment return while at the same time, protecting against participant fraud, misuse, or exploitation of the client's account by the client himself or any other third party.

The present invention provides a data processing method and apparatus for managing and tracking air travel and associated hotel/transportation accommodations with minimum inconvenience to the client, while monitoring the growth of funds in a client's travel-supporting, initial investment base. The air travel system of the present invention requires an initial investment by the client which allows the client to travel with minimum restrictions over the course of a preselected timeframe. This initial investment is carefully monitored by the system and, when the time period has elapsed, a significant return on the initial investment will be available for the client, commensurate with the timeframe selected, provided that the minimum restrictions on travel usage have been followed. By way of example only, the range of initial investment may be from $10,000 to $60,000 and the preselected time frame may be from 5 to 20 years. Depending, of course, on the available interest rates, the return on the initial investment over such a time frame may, for example, be from 50-75%. It should be apparent that other ranges of initial investment amounts, timeframes, and rates of return are also contemplated by the present invention subject to system constraints identified hereinafter. Additionally, the present invention contemplates associating borrowing, checking writing privileges as well as insurances benefits with a participant's investment account.

In operation, the air travel data processing system of the present invention makes reservations for air travel and, if desired, any associated hotel or transportation accommodations. The client can make reservations over the telephone (800 number) or in person at any travel agency after being properly identified, e.g., through the use of an identification card or the like. Thereafter, reservations are confirmed in writing and tickets may be delivered, if desired and if time permits.

The present invention uniquely tracks each client's cumulative travel usage for the purpose of authorizing travel requests and ensuring a predetermined minimum return on an initial investment base over time (e.g., a 50% return) as will be explained in detail below. Such variables as cumulative mileage, frequency of use and level of service (i.e., first class, coach, etc.) are translated into cumulative cost figures which are carefully tracked and compared with a "travel ceiling". The travel ceiling may be based on one or more system constraints taking into account such factors as air miles travelled, dollars expended, etc., to prevent fraud, misuse, or exploitation of the client's account and/or to provide the participant with a predetermined investment return. As used hereinafter, this ceiling represents a constantly varying reference baseline of maximum travel usage available to the client at any given time to stay on course to achieve an expected return on the initial investment. The air travel data processing system of the present invention monitors usage upon each reservation made by participating clients, and generates a monthly summary for each client declaring where the client stands with respect to the current "travel ceiling" at each instance.

The air travel data processing system of the present invention also tracks the cumulative growth of each client's investment in light of the client's cumulative usage. The client's initial investment is pooled with all other accounts and invested in a high-yield investment fund with flexible withdrawal privileges. The growth of this high-yield fund becomes the driving force against which the growth of each client's account is indexed. In this regard, the higher the prevailing interest rate, the faster each client's investment base will grow and the more the client may travel, while nevertheless staying on track to achieve a predetermined return on his initial investment base which thus ensures a predetermined reduction in the client's net travel costs. The data processing system of the present invention by uniquely indexing investment growth with travel services usage brings an added dimension to the travel services industry.

BRIEF DESCRIPTION OF THE DRAWINGS

These as well as other features of this invention will be better appreciated by reading the following detailed description of a presently preferred embodiment taken in conjunction with the accompanying drawings of which:

FIG. 2 is a schematic diagram of an alternative embodiment of hardware elements in the data processing system of the present invention;

FIG. 4 is a schematic diagram depicting the transactions which the data processing system of the present invention controls and monitors;

FIG. 6 is a graph depicting investment growth rate as a function of prevailing interest rates for plans extending over 5, 10 and 15 years;

FIG. 7 is a schematic diagram of the data arrays utilized for storing account balances;

FIGS. 8A and 8B are representations of an exemplary client account format and its associated transaction file format, respectively;

FIGS. 10A-D are flowcharts delineating the sequence of operations performed by the update client file routine;

DETAILED DESCRIPTION OF THE DRAWINGS

Figure 1:
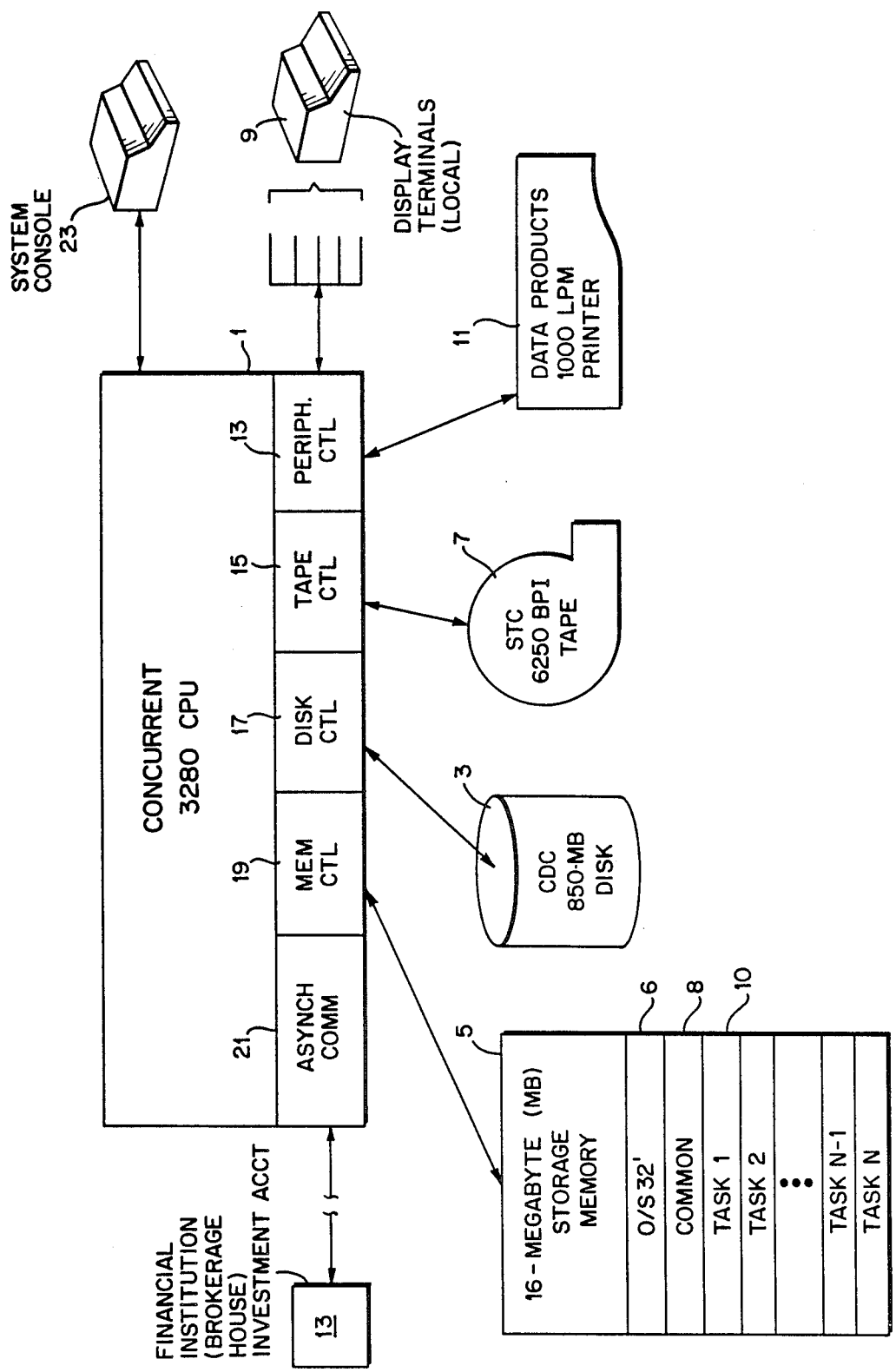
FIG. 1 is schematic diagram of an exemplary embodiment of the hardware elements in the data processing system of the present invention.

As shown in FIG. 1, the heart of the data processing hardware elements of the present invention is the Concurrent (formerly Perkin-Elmer) 3280 Central Processing Unit 1 (CPU). The 3280 CPU is extremely fast and efficient and is powerful enough to handle a large volume of nearly simultaneously requests for travel service processing. In this regard, the CPU processes on the order of 6 million instructions per second, and is therefore fully capable of handling the potentially large volume of travel processing tasks with an extremely fast response time.

The CPU 1 creates the client travel account data files (as will be explained further below) and stores such data files on disk 3, which may, for example, be a CDC-850 mega byte (MB) disk manufactured by Control Data Corporation. Many of the programs controlling the CPU are likewise stored on disc 3. These programs are selectively retrieved and executed to accomplish the travel management tasks of the present invention on a periodic and on an operator demand basis.

In the FIG. 1 embodiment, CPU 1 receives travel request processing tasks from individual clients and/or travel agents who utilize an 800 phone number service to initiate such travel requests. These client requests are entered into the system via display terminals 9, which may, for example, be Lear Siegler ADM-11 display terminals. Each input travel request is processed one of N separate tasks (1, 2, ..., N-1,N) by the CPU 1 after being stored in a first-in first-out (FIFO) stack resident in 16-MB storage memory 5 in, for example, a storage area designated as 10 in FIG. 1. Also resident in memory 5 is the operating system 6 for the 3280 CPU, commonly designated as O/S 32. O/S 32 provides a multitasking environment in which all travel-related tasks (1, 2, ..., N) communicate through a shared "global" common memory area.

By way of example only, information required for all the task processing, such as the predetermined interest rate to be used for monitoring investment maturation, is stored in the common memory area 8 where it is used in processing each of the client travel request tasks as will be explained further below. As noted above, the higher the prevailing rate, the more a client will be permitted to travel; hence each client travel request is analyzed by the CPU 1 in light of the prevailing rate.

Memory 5 is utilized by CPU 1 via memory controller 19 for loading and executing programs relating to client file updating, client request processing, saving updated "global" data back on disc 3, etc. In view of the 32 address bits available in the 3280 CPU, virtually unlimited expansion of memory 5 is contemplated by the present system. Additionally, as will be appreciated by those skilled in the art, additional disc drives can be utilized by CPU 1 via the disc controller 17, should the data files exceed 850 MB. The tape unit 7, which may be an STC 6250 bits-per-inch (BPI) drive, serves as a back-up memory under the control of CPU 1 via tape controller 15 and is used to preserve the disc contents as archival data and/or in case of a power failure, disc head crash, or other system catastrophe.

The system also includes a printer 11. The CPU 1 interfaces with display terminals 9 and printer 11 via a conventional peripheral controller 13. The printer 11 may, for example, be a Data Products 1000 lines-per-minute (LPM) printer for producing, e.g., periodic monthly statements, hard copies of individual status requests, etc.

The data processing system of the present invention further communicates with a financial institution 13, which may be a bank, a brokerage house, or the like. A computer in financial institution 13 receives, for example, information from CPU 1 regarding the amount of daily withdrawals required to cover travel requests and new account information. In return, it transmits to CPU 1 prevailing interest rate indicia and the amount of interest credited to the high-yield investment fund.

FIG. 2 shows an alternative embodiment of the present invention wherein all of the customer accounts may be accessed remotely by, for example, travel agents via modems 25. System components which operate identically, as described above, will not be discussed with respect to FIG. 1. By utilizing a remote terminal (not shown) similar to display terminals 9 via a modem 25, a travel agent can directly input a customer travel request by keying in a customer name, account number, etc., and can directly receive a response without the need for an 800 number.

In the system shown in FIG. 2, the CPU 1 operates as the executive controller that assigns tasks to a bank of slave auxiliary processor units (APU) 27, 29 and 31. Each APU is identical in structure to the 3280 CPU so that it includes, for example, the same peripheral tape, disc, and memory controllers shown with CPU 1, as well as it own asynchronous communication interface 21. APU 27 is dedicated to handling the relatively slow input-output communications between the tasks (1, 2, .. ., N) and the modems linked to associated remote terminals.

In the FIG. 2 embodiment, CPU 1, for example, monitors a job queue in memory 5 and assign tasks to a particular APU for processing. In this fashion, the APU's 29 and 31 relieve CPU 1 of much of its processing requirements. Each APU handles multiple tasks, one for each incoming request. Each APU locks out the client's account from all other APU's while it processes the client's travel request and updates the client's account on disk 5. As noted above, a separate APU 27 is dedicated to multiplexing all input-output from each active task to the remote terminal which initiates its respective travel request.

All tasks access and update pertinent system data (for example, prevailing interest rate, cumulative withdrawls, etc.) through the global common memory area 8. There should be no competition to update (lock-out) the same client account file, since the client only generates one travel request at a time through a remote travel agency terminal. Any conflicts arising from internal status inquiries via display terminals 9 are resolved by CPU 1 prior to task assignment, according to the priority of the requesting display terminal. In the FIG. 2 embodiment, where travel agents have direct access to the system via modems 25, the display terminals 9 need only be utilized for local status inquiries, rather than travel request input.

Figure 3A:
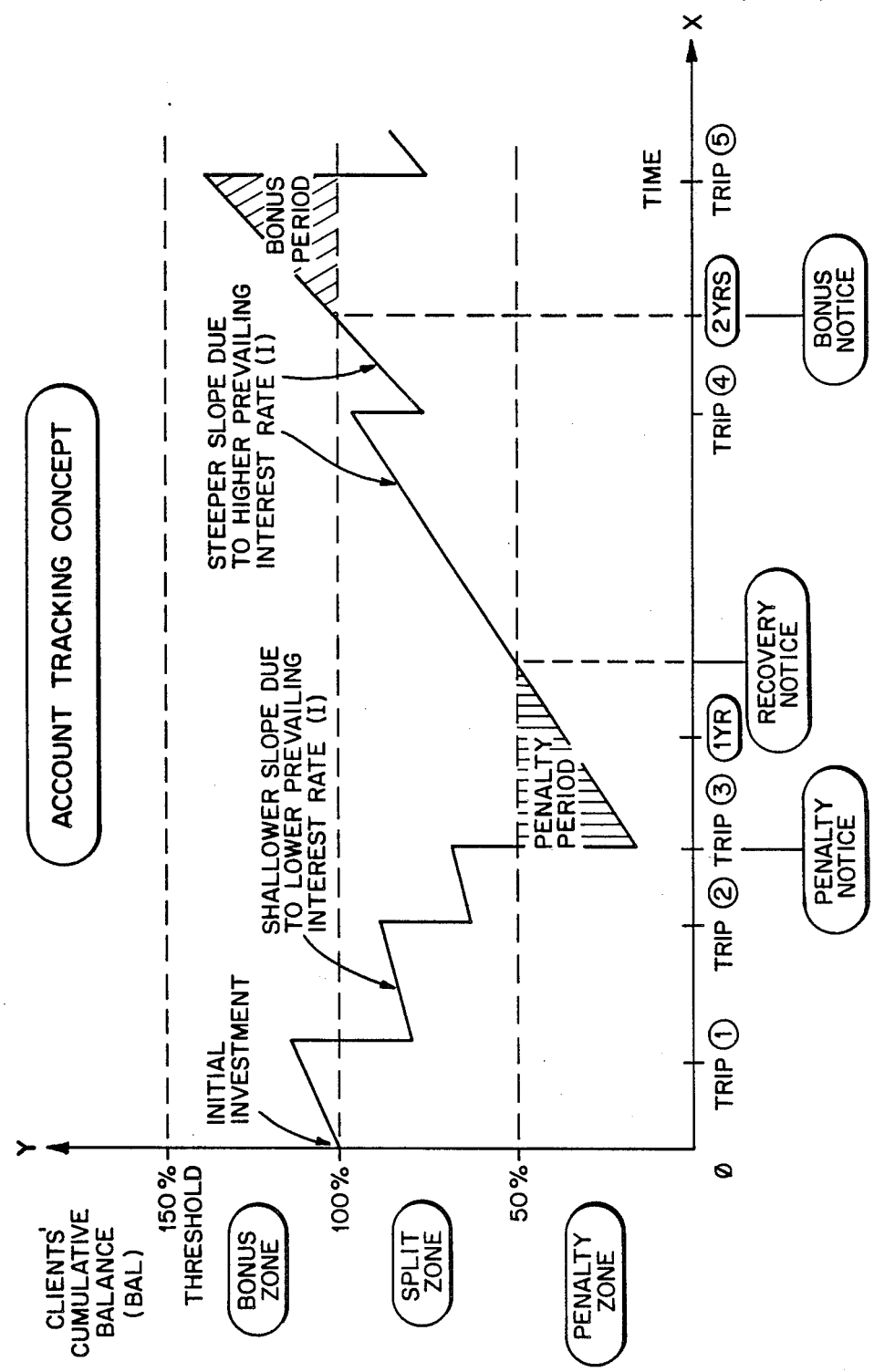
FIGS. 3A and 3B are graphs which introduce the concept as to how a travel account is monitored over time.
Figure 3B:
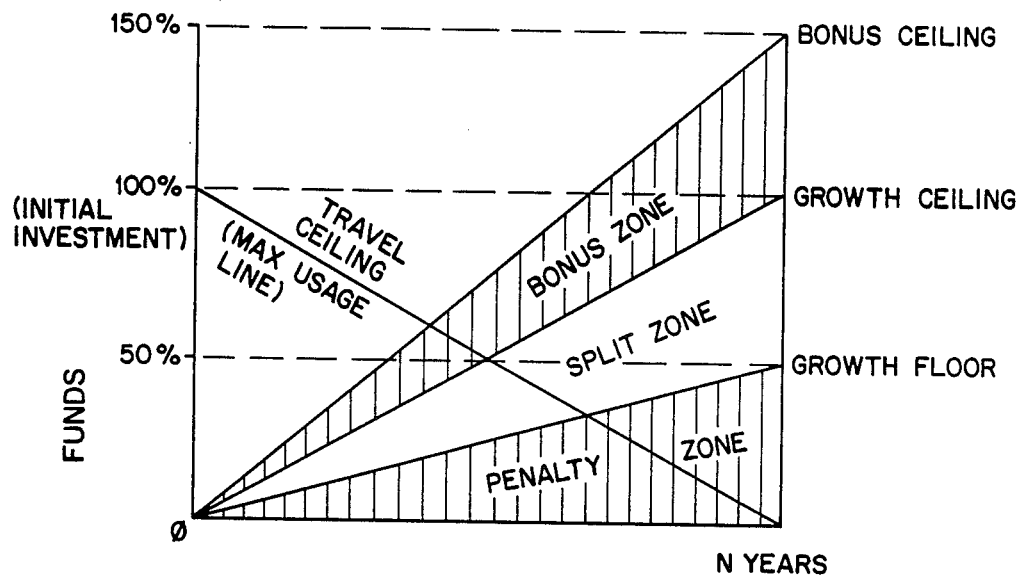

Before discussing the software elements of the data processing systems of FIGS. 1 and 2, the travel account tracking concept implemented by the present invention is explained in conjunction with the graphs shown in FIGS. 3A and 3B. As noted above, the present invention uniquely tracks a client's travel and indexes such travel to the growth of the client's initial investment base so as to ensure a predetermined expected return on the investment.

The graph shown in FIG. 3A plots a client's cumulative travel balance as a function of time, which serves to visually depict the nature of the data processing tracking concept of the present invention. The present system "tracks" the cumulative flow of a client's account balance from the client's initial investment, taking into account each trip taken across the entire timeframe of the selected plan (e.g., 5 years, 10 years, or 15 years).

Along the Y axis in FIG. 3A, the client's cumulative balance is initially at the 100% level. The client's initial investment will mature over time as a function of the predetermined interest rate applied to the account (hereinafter the prevailing interest rate) and the nature and frequency of travel usage. The client's cumulative investment balance (BAL) is updated each month in light of the prevailing interest rate. In the interim, as each travel request is received, the cumulative balance is projected forward based upon the prevailing interest (in a manner which will be explained below) to determine the "displacement" that the requested trip will cause from the current balance level.

A "penalty notice" is issued if such a displacement forces the balance below a predetermined threshold, e.g., a displacement which will make it unlikely for the client to obtain a return of 50% of the initial investment at the end of a predetermined time period. In effect, the penalty notice states that, if the requested travel is honored, the system can no longer guarantee the predetermined return on the investment. If desired, during the penalty period, the data processing system may optionally keep track of a penalty fee to be assessed to the account while the account is within the penalty period, until the account returns to the 50% growth rate level, as shown in FIG. 3A. If the account remains dormant after falling into the "penalty zone," it will eventually rise to the 50% threshold via accumulated interest, whereupon a "recovery notice" is issued. The recovery notice states that the account is back on track and can once again guarantee the predetermined return of the original investment. If the balance rises above the 100% growth rate threshold, a "bonus notice" is issued whereupon benefits such as free travel will be offered to the client based on the account displacement above the 100% threshold. Other benefits such as borrowing privileges and insurance benefits may optionally accrue to client accounts achieving the bonus status.

Focusing on FIG. 3A, starting at the entry date into the program (i.e., $X=0$), the initial investment will begin to grow above the 100% level (i.e., $Y=100\%$) at a rate based upon the prevailing interest rate. It should be recognized that while the exemplary embodiment shows 100% of the initial funds being invested, the present invention alternatively contemplates allocating a predetermined percentage of funds solely for travel services, e.g., 85%, and the remaining funds, e.g., 15%, solely for investment growth. Turning back to FIG. 3A, the account balance will continue to rise as a function of a compounding interest rate until the client decides to take a trip at which point the balance will drop significantly as indicated by the point referenced as trip 1.

After the first trip, the new account balance will again rise in time as shown in FIG. 3A. However, if the interest rate happens to be at a lower rate than prior to the first trip, the account balance will increase at a lower growth rate as reflected by the shallower slope between trips 1 and 2. During the first year of travel the graph shows that the client took a second trip with the resulting decline in the investment balance coupled with the expected growth rate in time (due to the prevailing interest rate).

As shown in FIG. 3A, the nature of the third trip was such that the account balance dropped below the 50% investment floor, which is the exemplary predetermined level demarcating a "penalty zone" for the system. Upon reaching the penalty zone, the participant is sent notification that his rate of usage is such that the predetermined expected return on the initial investment can no longer be guaranteed by the system. A penalty fee is assessed to the client account (much like a penalty is assessed when a bank account goes below a predetermined balance) until the account moves out of the penalty zone. Based on this penalty fee and the prevailing interest rate, the account should eventually increase in time back to the 50% threshold, at which point a recovery notice is issued to the client.

By way of example only, the interest between trip 3 and 4 increased to a higher rate than any of the previous rates (as reflected by the steeper slope shown in this portion of the graph). After the client's fourth trip and the associated decline in the account cumulative balance in this example, the account continues to grow until the investment base eventually exceeds the initial investment which places it in a "bonus" zone. While in this bonus zone, the data processing system of the present invention keeps track of free travel bonuses which are awarded on a monthly basis to the client during the time frame that the investment base remains over 100%. It is noted that although travel is awarded to the client during this time period, the managing corporation captures a percentage of the growth in the investment base over 100% which may, for example, go to the corporation's capital reserve.

Before leaving the graph shown in FIG. 3A, note that three zones have been defined by the dotted lines in the graphs and have been designated as the "bonus," "split," and "penalty" zones. Each of these zones should be viewed in terms of keeping track of the client's travel usage so as to monitor the rate of depletion of the client's initial investment base. In particular, the client's travel usage must be carefully tracked to ensure that a predetermined rate of return of the initial investment will be achieved at the expiration of the time period for the client's selected program. As noted above, this predetermined threshold has been defined (by way of example only) as being a 50% threshold of initial investment growth by the end of the program time period, e.g., 5, 10 or 15 years.

The maximum allowable rate of depletion or maximum allowable travel usage is referred to herein as the "travel ceiling," which is graphically depicted in FIG. 3B. As noted above, the travel ceiling may be defined in terms of one or more system constraints to prevent fraud or misuse of the client's account and may take into account factors such as air miles travelled, frequency of use over time, etc. For the purpose of the projections made in the present system, the travel ceiling has been defined in terms of a linearly declining balance of travel funds. Thus, the baseline from which a client's travel usage is monitored runs linearly from the 100% of the initial investment at the start of the program, to 0% at the end of the program, as shown in FIG. 3B.

When usage exceeds the travel ceiling, as discussed above, the account falls below the 50% growth floor which is labelled the "penalty zone" in FIGS. 3A and 3B where a nominal operating fee is charged as a penalty. While the 50% return on the initial investment is arbitrarily referred to as the "growth floor" area, performance calculated to achieve 100% of the initial investment is referred to as the "growth ceiling". When usage falls below the travel ceiling, the account fluctuates between the growth floor and the growth ceiling and is referred to in FIGS. 3A and 3B as the "split zone." In this split zone, the growth in the client's account is split between the client and the managing company. The last zone shown in FIGS. 3A and 3B is the "bonus zone." If the client's usage stays well below the travel ceiling and/or the prevailing interest rates in the marketplace grow to well above a predetermined threshold rate, the account may rise above the 100% growth ceiling, where the excess is split between the client, in the form of free travel, and the company as capital reserve.

To appreciate the nature of the processing required to implement the air travel system of the present invention, FIG. 4 generally depicts the nature of the transactions which the system is responsible for monitoring and controlling. In this regard, the transaction flowchart shown in FIG. 4 may be logically divided into initial investment, monthly update and travel on demand subsections. The system software which implements the monthly update and travel on demand sections are described in detail below in conjuction with FIGS. 10-12.

Entry into the system begins with a client's initial investment (100). The initial investment is placed into a high-yield fund at a financial institution such as a brokerage house or a bank (102). As noted above, alternatively any predetermined percentage of a client's initial investment may be allocated solely for travel service usage, (e.g., 85%), while the remaining funds (e.g., 15%) may be allocated solely for investment. In any event, the high-yield fund reflects the pooling of all client investments into a common investment fund at the financial institution (104). The prevailing interest rate (i.e., the predetermined rate applied to the client accounts) is periodically (daily, weekly or monthly) fed back to the data processing system (106) so that the processing system can monitor the growth rate of the entire investment fund.

The current growth rate of the investment fund is thereafter compared with the individual client account thresholds (as will be explained further below) to determine the status of each client account (108) and, to determine, for example, how much travel funds are cumulatively available to the client. Thus, during periods where there is a higher than expected prevailing interest rate, a client's account balance will grow faster than anticipated. Consequently, more funds will be available for travelling than were anticipated, while still keeping on track with the desired predetermined rate of return.

As noted above (by way of example only), the threshold defined as the minimum rate of return or growth floor is 50% of the initial investment. One hundred percent (100%) of the initial investment has been defined as a "growth ceiling" threshold (110). If the prevailing interest rates are such that they are not sufficient to sustain account growth so as to guarantee the predetermined minimum rate of return, (e.g., 50%), then the system enters into a deficit zone (112, 114). Under such circumstances, whatever deficit the low interest rate is producing must be drawn from the managing company's capital reserve (120) in order to ensure that the client's account will generate the desired return. Thus, with the funds from capital reserve, the client account is incremented up to the desired 50% rate of return level (130).

On the other hand, if the prevailing interest rates are such that the 100% growth ceiling will be exceeded, then the system enters into the "bonus zone" in which the excess over the 100% threshold is split between the company and the client (116, 118). In this regard, by way of example only, the client receives free travel (122), whereas the company receives a contribution to its capital reserve (120). If the interest rate is such that the 100% threshold is exceeded, then it follows that the 50% threshold will likewise be exceeded, in which case the company will split the excess between 50 and 100% with the client (as indicated by the connection between blocks 118 and 126 in FIG. 4). Such a split may, for example, result in the generation of company profit (128), as well as incrementing of the client account (132).

Finally, if the interest rate is such that the client account falls between the 50% and 100% (124) thresholds (as would normally be expected), the associated growth rate will trigger an excess over 50% (126), resulting in both company profit (128) and an increase of funds in the client account (132) as mentioned above. Upon splitting the excess over 50% in block 126, the client account will be incremented up to the 50% threshold level (130) as indicated by the connection between blocks 126 and 130.

In addition to the periodic (e.g., monthly) processing described above, the air travel system of the present invention is driven by client travel requests on a demand basis. Thus, as indicated in block 134, a client may request travel either by utilizing an 800 number (as explained above with respect to the FIG. 1 embodiment) or by directly accessing the system via modems (as explained above with respect to the FIG. 2 embodiment).

In either embodiment, it is critically important to verify the client's identity (136). In order to protect against fraud or other unapproved use of the system, each client is provided with an air travel system medallion card having a unique card number, as well as a personal I.D. number known only to the client. The client can make a reservation over the phone by identifying his card number and personal I.D. number. Additionally, if further security is required, the client may be required to identify his/her last trip taken. If the client's I.D. is determined to be invalid, than the client's travel request is denied (140).

On the other hand, if the system verifies that the client's I.D. is valid, then the client's travel request amount is compared with the current balance (138). To do this, the system must first generate the client's available balance and calculate the client's travel ceiling (142).

Based upon these calculations, the data processing system of the present invention determines what the account status would be if the requested travel were approved and the trip actually taken. Based on this projection, if the travel request exceeds the balance available in the account (139), then the travel request is denied (140). As an alternative to denying the travel request, if desired, the client may be given a travel margin benefit, or a loan at a predetermined interest rate or the like to permit the client to travel.

If the projection indicates that the client's request exceeds the travel ceiling (144), then the client must be notified that a penalty will result (146). Upon the client responding to the penalty notice by signing (or agreeing to sign), for example, a waiver acknowledging that the projected minimum rate of return can no longer be guaranteed (148), then the system will issue appropriate tickets for the requested travel (152).

If the client's travel request is below the maximum allowable usage or rate of depletion (150), as would normally be the case, then the system will issue the appropriate tickets (152). The tickets or vouchers may be transmitted to the client in a variety of fashions, either via a travel agent or directly through the mail. Alternatively, the tickets may be sent to the appropriate airport to be picked up by the client.

Upon the issuance of the tickets (152), the total cost of the trip is deducted from the client's travel account (156) thereby resulting in a reduction of the client's account balance (158). The amount decremented from the client's account is thereafter withdrawn from the investment fund, as represented by the dotted line interconnected blocks 158 and 104. For convenience, the decrements for all accounts may be accumulated into a single withdrawal at the end of the banking day.

Figure 5:
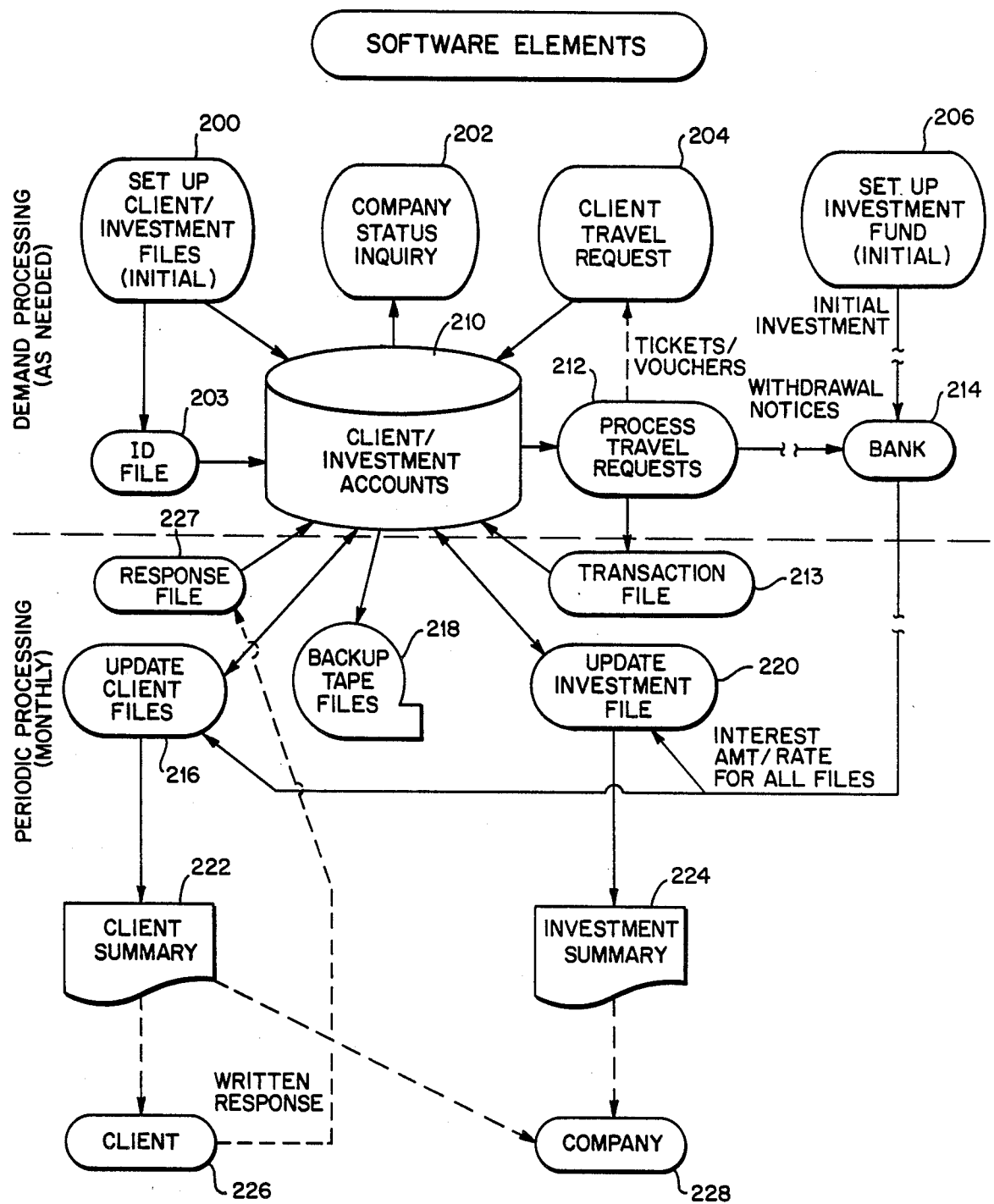
FIG. 5 is a schematic diagram of a system including the software elements of the present invention.

FIG. 5 is a schematic block diagram of the present system highlighting the software elements necessary to control the computer system shown in FIG. 1 so as to implement the present invention. The elements shown above the horizontal dotted line in the center are event-driven and function to enter or process data as needed on demand. The elements below the dotted line process data periodically (e.g., daily, weekly, monthly) to repetitively perform predetermined tasks.

As indicated at block 200, the system must initially set up the client and investment files which are stored on the disk 3 shown in FIGS. 1 and 2. Likewise, in order to initialize the system, the investment fund must be set up in conjunction with a financial institution such as a bank or brokerage house (206, 214). Part of the initial set up for a new client account file initial set up involves assignment of a security ID code to the new client. These ID codes are stored in ID file 203 whose file format is shown below.

| ID FILE FORMAT | | | | |
|---|---|---|---|---|
| ACCOUNT # current/ transferred | ID # current/ last | NAME | ADDRESS | START/ DATE mo/yr |
| A | aaaa | | | |
| B | bbbb | | | |
| C | cccc | | | |
| . | . | | | |
| . | . | | | |
| . | . | | | |
| Z | zzzz | | | |

The ID file which is stored on disk 3 has been strategically segregated from the main CLIENT ACCOUNT files to protect the valuable ID#'s from casual observation by system operators. Access to this file is granted by the system only to the individual acting as system administrator through the system console (23) of FIG. 1. The ID#'s have not been inserted in the CLIENT ACCOUNT format, and their usage is confined to being entered by the operator (called by the client) and validated by the system all without screen presentation. Up to four (4) successive attempts are allowed before the system suspends the account and demands confirmation in writing that the client himself is attempting to enter the wrong ID#. The ID numbers can be easily changed periodically with proper notification to the client at the address of record.

The system software also permits company management officials to make status inquiries of the system (202). As indicated by block 204, the present system responds to an input client travel request by transferring client account indicia to a process travel request routine 212. As will be explained further below in conjunction with FIG. 12, the process travel request routine serves to verify a client's I.D., to determine whether the travel request is within the boundaries discussed in conjunction with, for example, FIG. 4. Presuming that the boundary checks yield satisfactory results, the output of the process travel request routine will be tickets and/or vouchers which go to the client. Concurrently, with the issuance of the tickets, as explained above with respect to FIG. 4, a fund withdrawal notification is sent to the bank (214), thereby decrementing the investment fund by the amount approved for travel requests.

Figure 8B:
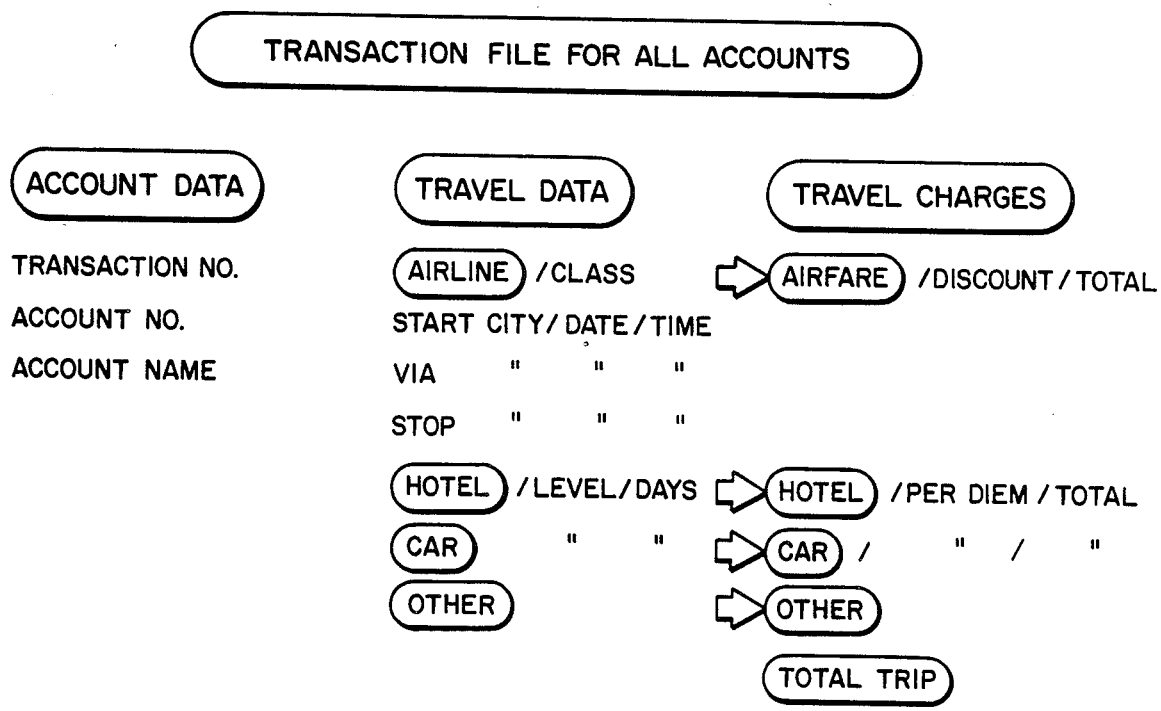

The process travel requests routine 212 additionally serves to provide transaction data to the transaction file 213 which is also stored on disk 3. The transaction file, format of which is shown in FIG. 8B, collectively stores the ongoing transactions generated by all the accounts each day. This file permits transaction data to be readily accessed for account auditing and/or analysis. The transaction file headings and fields are self-explanatory and are discussed below in conjunction with the client account file format.

Focusing on the periodic processing that occurs within the system, the client/investment accounts 210 which are stored on disk are periodically backed up on the tape files 218. Presuming that the periodic processing is performed on a monthly basis, the client files would be updated once each month by an update client files routine 216 (which is discussed in detail below in conjunction with FIG. 10) to reflect usage of the system throughout the month. Thus, while a client travel request entry at 204 will serve to add an additional increment of travel indicia into the client's investment account stored on the disk 3, the update client files routine at 216 serves to provide a cumulative tabulation of all of the travel requests that have been granted by the system. The update client files routine 216 will utilize prevailing interest rates transmitted or received from the bank 214 to make projections as to whether the client is on track in meeting the predetermined minimum account growth rate threshold. Once the client account files have been updated, they are stored back on disk for subsequent interrogation for the next travel request. The process travel requests routine (212) must be locked out during this update to avoid obtaining an out-of-date balance. Therefore, the update client files routine (216) must be run off-line during non-peak hours.

The update client file routine 216 will also generate a client account summary 222 which is transmitted to the client 226, as well as to the company 228. The client summary at 222 informs the client of not only the current status of his account, but also the projection made by the update client files routine 216. As with the process travel request routine 212, this projection shows where the client's investment fund base will be at the end of the client's participation in the air travel program if the current rate of travel usage continues. The client summary report will also inform a client who is below the 50% rate of return "growth floor" as to how far below the growth floor he or she is and how much capital is required to get back to that 50% growth floor. On the other hand, for a client who has exceeded the 100% growth ceiling, the system will inform the client as to how much free travel is available.

From time to time, the system expects to receive certain responses from a client. A record of the responses is stored in responses file 227 on disk 3 in the format shown below.

| RESPONSE FILE FORMAT | | | | | | |
|---|---|---|---|---|---|---|
| ACCOUNT # | NAME | DATE | PURPOSE OF RESPONSE | | | SYSTEM CHECK OFF |
| | | | SIGNED WAIVER | ID CONFIRM | REQUEST CLOSEOUT | |

The RESPONSE file 227 is an open-ended file, sorted in ascending ACCOUNT # sequence. As each response is received, it is logged in as a single record with one or more purposes. If the client has been asked to sign a waiver acknowledging that he is in the PENALTY zone, the response must so indicate that waiver within one month. If the client has attempted to enter the wrong ID# four times or has otherwise used an improper medallion card or questionable ID, the response must confirm that he was in fact the party in error. At any time, the client may request closing out his account, subject to an early withdrawal fee if he is in the PENALTY zone at that time. As the system acts upon each response, it checks off the associated RESPONSE record so that it can be routinely deleted on a periodic basis.

The update investment file routine shown at 220 serves to summarize the cumulative balance totals for each of the clients in the system. In addition, the updated investment file routine keeps track of the company's profits as well as the capital reserve status during the transactions discussed in FIG. 4 with respect to blocks 120 and 128. Additionally, the update investment file routine 220 tabulates how much of a deficit the company has had to make up in order to increment each client account up to the 50% level, if such a deficit in fact ever arises. The updated investment file is stored back on disk for subsequent status inquiries 202. Just as with the update client files routine 216, the update investment files routine 220 must run off-line after hours, since it must lock out all other interrogations during the update.

The output of the update investment file routine is summarized in an investment summary report 224 which is transmitted to the company 228. Like the update client files routine 216, the update investment file routine 220 receives the prevailing interest rate which it utilized to project the cumulative growth of the overall investment base in view of travel usage by all of the clients.

Before focusing on the details of the routines discussed above, a brief analysis of how the present system uses the prevailing interest rates to project the percentage growth rate of a client's investment base is described below. Through the use of such a projected growth rate, the system monitors the cumulative growth of a client's initial investment as a function of usage and interest rates. It then enforces constraints as to usage to insure that the client receives at least a predetermined minimum return on his or her initial investment.

The return on a client's initial investment projected at any given prevailing interest rate can be expressed as a rate of growth (percent) of the initial investment over the term of the client's participation in the air travel program. By way of example only, it is contemplated that a client will have a choice of selecting five-year, ten-year or fifteen-year timeframes for participation in the program. In order to provide a baseline for monitoring a client's travel usage, an initial step is to find the "threshold" interest rate for each of the five, ten and fifteen year plans that will yield the predetermined minimum "floor" growth rate (e.g., 50%) and the desired "ceiling" growth rate (e.g., 100%).

Once the 50% floor and 100% ceiling rates for each plan are established, any deviation of the current interest rate from the 50% floor rate can be carefully monitored in light of each client's rate of usage. For the purpose of projecting whether the minimum rate of return will be achieved at the end of the term of a given plan, the system assumes a linearly, declining balance for a given account (see FIG. 3B). Under this assumption, each plan has target average interest rates which must be achieved in order to obtain, for example, a 50% return on the initial investment. Likewise, there are higher target interest rates at which each plan will yield a 100% return.

As indicated above with respect to FIG. 4, the present system bases a multitude of processing decisions on whether the growth rate of a client's initial investment at any given point in time is within predetermined boundaries. Such a growth rate may be determined based on the equations shown below and expressed as a percentage of the client's initial investment ($X_O$). Thus, one exemplary approach for calculating the investment growth rate shown in Table I below as follows:

TABLE I

GENERALIZED ALGORITHM FOR
CALCULATING GROWTH RATE

N = no. of years    X = end balance    I = interest rate
i = current year    $X_0$ = initial funds    BAL = cum bal.

(1) end bal for current year (i):

$$X_i = \left(X_{i-1} - \frac{X_0}{N}\right)\left(1 + \frac{I}{2}\right)$$

(2) cumulative bal. for total year (N): BAL =

$$\sum_{i=1}^{N}\left(X_{i-1} - \frac{X_0}{N}\right)\left(1 + \frac{I}{2}\right)$$

(3) growth rate (%): RATE = $\frac{BAL}{X_0}$

This is a generalized algorithm for calculating growth rate (RATE) expressed as a percentage of an initial investment $X_\phi$.

It can be modulated for any number of years N as a total timeframe at any constant interest rate I. It is independent, however, of the size of the initial investment $X_\phi$, whether it is $10,000, $20,000 or even $60,000, because the growth rate is a percentage of $X_O$.

The cumulative balance (BAL) for any intervening year (Y) within the given time frame (N) can be calculated by simply summing BAL for i=1, 2, ..., Y. This algorithm also allows the system to calculate the BAL of any client withdrawing from the program at any time. For convenience herein, this algorithm has been confined to accumulating interest on a yearly basis. It would be apparent to one skilled in the art how to compound the interest monthly, or even daily, for greater precision.

Focussing on equation 1 above, in order to determine the ending balance ($X_i$) for a current year i, (where i runs from 1 to N), this current end balance is calculated from the last year's balance ($X_{i-1}$) minus a linear decrement equal to the initial investment ($X_\phi$) divided by the number of years (N) in the plan; times an interest rate factor which is 1 plus the current interest rate (I) divided by 2. This takes into account the fact that the prevailing interest rate is operating on a linearly declining balance and, thus, only 50% of that interest rate would be realized for the entire year.

Taking, for example, where i=1, (i.e., at the end of year 1), where the initial balance is presumed to be $20,000 the interest rate I=10%, and the number of years N is 10, then $X_i$ would equal $20,000 minus $20,000 divided by 10 times (1 plus 10%, the prevailing interest rate, divided by 2) equals $20,000 minus $2,000 times 1.05, equals $18,000 times 1.05 or $18,900.

With respect to equation 2, the cumulative balance for the total years end is merely the summation of the N balance for the current year i, i.e., $X_i$ where i names from 1 to N. The growth rate as defined by equation 3 may then be calculated by dividing the cumulative balance for the total years divided by the initial investment $X_\phi$).

Table II below shows the return on the investment, expressed as a growth rate percentage, as a function of the timeframe of the plan, as well as the prevailing interest rates. This table, as well as the plot of this data shown in FIG. 6, presumes that the initial investment balance will decline linearly at 20% per year for the five-year plan, 10% per year for the ten-year plan, and 6.7% per year for the 15-year plan.

The Table II and the associated plot in FIG. 6 indicate what the growth rate of the initial investment will be if the prevailing interest rate is maintained at any of the rates shown between 5% and 15%. Thus, Table II shows the growth of the initial investment associated with the listed interest rates.

To appreciate the practical significance of these values, FIG. 6 shows a plot of the percentage growth rate as a function of the prevailing interest rate for the five-year plan, the ten-year plan, and the fifteen-year plan respectively. The data shown in the graph of FIG. 6 represents the use of formulas 1, 2, and 3 shown above where calculations were augmented with interest being compounded on a monthly instead of yearly basis. Each of the curves shown in FIG. 6 presume a linearly declining balance.

TABLE II

| TIMEFRAME OF PLAN | RETURN ON INVESTMENT (expressed as GROWTH RATE %) | | | | | | | | | | |
|---|---|---|---|---|---|---|---|---|---|---|---|
| | INTEREST RATE | | | | | | | | | | |
| | 5% | 6% | 7% | 8% | 9% | 10% | 11% | 12% | 13% | 14% | 15% |
| A. 5 Years balance declining linearly at 20% per year | | | | | | | | | | | |
| 1st yr | 4.6% | 5.6% | 6.5% | 7.5% | 8.5% | 9.4% | 10.4% | 11.4% | 12.5% | 13.5% | 14.5% |
| 5th yr | 14.8 | 18.3 | 22.1 | 26.1 | 30.4 | 34.9 | 39.8 | 44.9 | 50.3 | 56.1 | 62.2 |
| B. 10 Years balance declining linearly at 10% per year | | | | | | | | | | | |
| 1st yr | 4.9 | 5.9 | 6.9 | 7.9 | 8.9 | 10.0 | 11.0 | 12.1 | 13.1 | 14.2 | 15.3 |
| 5th yr | 21.5 | 26.6 | 31.9 | 37.6 | 43.4 | 49.7 | 56.3 | 63.3 | 70.6 | 78.3 | 86.4 |
| 10th yr | 35.0 | 45.0 | 56.3 | 69.0 | 83.3 | 99.3 | 117.4 | 137.4 | 160.0 | 185.1 | 213.2 |
| C. 15 Years balance declining linearly at 6.7% per year | | | | | | | | | | | |

TABLE II-continued

| TIMEFRAME | RETURN ON INVESTMENT (expressed as GROWTH RATE %) | | | | | | | | | | |
|---|---|---|---|---|---|---|---|---|---|---|---|
| | INTEREST RATE | | | | | | | | | | |
| OF PLAN | 5% | 6% | 7% | 8% | 9% | 10% | 11% | 12% | 13% | 14% | 15% |
| 1st yr | 5.0 | 6.0 | 7.0 | 8.0 | 9.0 | 10.1 | 11.2 | 12.3 | 13.4 | 14.5 | 15.6 |
| 5th yr | 23.8 | 29.4 | 35.2 | 41.4 | 47.8 | 54.7 | 61.8 | 69.4 | 77.4 | 85.7 | 94.5 |
| 10th yr | 44.9 | 57.3 | 71.2 | 86.7 | 103.9 | 123.1 | 144.5 | 168.3 | 194.7 | 224.2 | 256.8 |
| 15th yr | 62.6 | 83.4 | 108.3 | 137.8 | 172.8 | 214.2 | 263.0 | 320.7 | 388.5 | 468.2 | 561.9 |

Focusing first on the curve for the five-year plan A (Curve $A_5$), for a prevailing interest rate of 5% over this time frame, it can be seen that the growth rate at the end of the five years will be approximately 15%. In order to achieve a 50% return on the initial investment, a prevailing interest rate of 13% would be required. Likewise to achieve a 100% rate of return, interest rates on the order of 20% would be required.

With respect to the ten-year plan B, (Curve $B_{10}$), at a 5% prevailing interest rate at the end of 10 years, a growth rate of 35% will result. A prevailing interest rate of 6.4% will serve to provide the minimum 50% return on the initial investment and a 100% return on the initial investment will result from a 10.1% prevailing interest rate.

Focusing on the fifteen-year plan C (Curve $C_{15}$), a prevailing interest rate of 4.2% will yield the minimum 50% return on the initial investment. A 6.7% prevailing interest rate will yield a 100% return on the initial investment. Thus, it can be seen that for any given plan as the prevailing interest rate increases above the 50% threshold, there is much more latitude for progressively increasing a client's usage travel, as the prevailing interest rate climbs above the minimum floor rates for each plan (i.e., 4.2%, 6.4% and 13% respectively).

Although the graphs shown in FIG. 6 presume a linear withdrawal of investment funds from a client's initial investment, this data is used only to provide a reference baseline for analyzing a client's usage. In this regard, while a client may be able to use his travel funds at a rate greatly exceeding that which is shown in these curves, the curves provide a basis for demonstrating how far the client's usage is departing from usage rate required to guarantee a predetermined minimal rate of return.

Before turning to the flowcharts, it is noted that the flow of program control centers around the control state of a unique set of control status words, which are listed in Table III below.

reflects a vesting status (initially CSWV=1). If the account rises above the 100% growth ceiling, CSWA2 goes ON indicating that CSWB now reflects a bonus status (initially CSWB=1). On the other hand, if the account falls below the 50% growth floor, CSWA3 goes ON indicating that CSWP now reflects a penalty status (initially CSWP=1). Clearly, an account cannot be in both a bonus state and penalty state at the same time, so only either CSWB or CSWP will be active at any given time.

If the client or an imposter attempts to use the account with the wrong ID number, CSWA4 goes ON indicating that CSWI now reflects an IDENT status (initially, CSWI=1), which implies that the most recent travel request has been denied. If this persists for 3 attempts (CSWI3 is ON) or the client's ID is rejected (CSWI4 is ON), the account is suspended on the next attempt (CSWA5 is ON). If the account advances through the successive CSWP/CSWI states to cashed out (CSWP6) or transferred to a new account (CSWI6), the account is terminated (CSWA6 is ON). If the account matures to the 5th level of vesting (CSWV5 is ON), the vested amount is cashed in (CSWV6 is ON) and any remaining bonus cashed in (CSWP6 is ON) then the account is finally closed out (CSWA6 is ON).

Beyond the ACCOUNT CSW (CSWA), the other CSW's advance progressively from their first state (bit 1 set) to their final state (bit 6 set) which implies that the account has matured to completion (CSWV6) or has been terminated by the client (CSWP6) or the system (CSWI6). Other than the VESTING CSW (CSWV), the remaining CSW's (CSWB/CSWP/CSWI) are independently set, advanced, and reset as the prevailing status of the account fluctuates. Thus, any of these CSW's may have several bits ON at the same time which may be reset to OFF as the condition of the account reverts back to normal.

The VESTING CSW (CSWV) advances sequentially as the account advances from one vesting level to

TABLE III

| | CONTROL STATUS WORDS (CSW'S) | | | | |
|---|---|---|---|---|---|
| CSW BIT POSITION (all bits off) | A ACCOUNT CSWA (no status) | V VESTING CSWV (no vesting) | B BONUS CSWB (no bonus) | P PENALTY CSWP (no penalty) | I IDENT CSWI (no ID error) |
| BIT 1 | VESTED | 1st level | 100% level | 50% level | 1st attempt |
| BIT 2 | BONUS | 2nd level | 150% level | waiver signed | 2nd attempt |
| BIT 3 | PENALTY | 3rd level | 200% level | projected out | 3rd attempt |
| BIT 4 | IDENT | 4th level | travel used | travel denied | ID rejected |
| BIT 5 | SUSPENDED | 5th level | level advanced | level denied | confirm req. |
| BIT 6 | CLOSED OUT | CASHED IN | CASHED IN | CASHED OUT | TRANSFERRED |

The relationship between these CSW's is as follows.

CSWA summarizes the current status of the account, which can be in one or more states at the same time. Upon startup, the account has no status, good or bad (CSWA=0). As the account reaches its first vesting level, CSWA1 goes ON indicating that CSWV now the next CSWV1, ..., CSWV5 in accordance with the qualification schedule of Table 4, which is shown below. As the account reaches the 5th and final level, CSWV remains at state CSWV5 until the client decides to cash in his vested amount (CSWV6). The client can, of course, cash in his policy at any earlier level for a modest closeout charge.

TABLE IV

QUALIFICATION SCHEDULE WHICH LOCKS IN MINIMUM RETURN ON INVESTMENT

| LEVEL OF QUALIFICATION | PLAN | | | AMOUNT LOCKED IN (%) |
|---|---|---|---|---|
| | A | B (YEARS) | C | |
| 0 | <1 | <2 | <3 | 5% |
| 1 | 1 | 2 | 3 | 10% |
| 2 | 2 | 4 | 6 | 20% |
| 3 | 3 | 6 | 9 | 30% |
| 4 | 4 | 8 | 12 | 40% |
| 5 | 5 | 10 | 15 | 50% |

The above qualification schedule, which defines the CSWV control states, guarantees the client that he will receive a minimum return on his investment should he decide to drop out of the plan at any time. The minimum amount guaranteed by the system is uniformly incremented from 5% to 50% at 5 milestones over the course of the plan. The purpose underlying this gradually increasing return on investment is to provide a predictable incentive to stay in the plan (A/B/C) for the full timeframe. (5/10/15 years). It also encourages the client to avoid entering the PENALTY ZONE which might prolong his time to reach the next level and/or reduce his return on investiment if he should not recover in time. Stated postively, it give the client an incentive to reach and lock-in intermediate goals on the road to achieving the final goal of 50% minimum return.

The account must stay below the "travel ceiling" throughout the course of the plan. If the account does on occasion exceed the travel ceiling, the client can still achieve the next level of qualification if he recovers (i.e., allows the account to catch up to the "growth floor") within the current qualification period. For example, if a client enters the PENALTY ZONE during the 3rd year of the plan B, he has until the end of the 4th year to recover by allowing his account to remain dormant.

Focusing back on the control status words, the bonus CSW (CSWB), also advances progressively as the account rises above the 100/150/200% levels of projected return on investment in the BONUS zone (CSWB1/CSWB2/CSWB3). At any time, the client may use the bonus amount as free travel (CSWB4). As the accumulated bonus amount reaches a predetermined threshold, the client may optionally decide to apply the bonus amount to advance the account by one vesting level (CSWB5), which essentially shortens the minimum life of the account by 20%. If desired, the client need not be given the opportunity to make such a decision. To preserve working capital for the system, the client can only cash in his bonus amount (CSWB6) at the completion of the account timeframe (CSWA6).

The penalty CSW (CSWP), advances progressively from one status to the next as the account remains in the PENALTY zone. Once below the 50% level, CSWP1 remains ON until the account recovers and reverts back to the normal SPLIT zone. The client must sign and return a waiver (CSWP2) acknowledging that, as long as the account lies in the PENALTY zone, the system cannot guarantee a 50% return on investment. CSWP3 indicates that, at the present rate of recovery, the account will not escape the PENALTY zone before the end of the current vesting period. At that time, if no steps are taken by the client, the system will deny advancement to the next vesting level (CSWP5). At any time, the client may choose to cash out his account with whatever its current balance is (CSWP6) for a modest closeout penalty.

The identification CSW (CSWI), advances progressively from the 1st attempt to use the account with an incorrect ID number (CSWI1) to the 2nd attempt (CSWI2) to the 3rd attempt (CSWI3). At any time, a local company representative or remote travel agent may reject the medallion card as a counterfeit or the cardholder as not matching his ID picture (CSWI4). As a safeguard against fraudulent usage, all activity in the account is suspended at CSWI3 or CSWI4 until the client signs and returns a confirmation that he attempted to use the account (CSWI5). If fraudulent attempts were made to utilize the account, or if the client does not acknowledge his incorrect ID within one month, the account is transferred to a new account number (CSWI6) to protect the client's investment.

CLIENT AND INVESTMENT ACCOUNT FILE FORMATS

As noted in the above description of the system software elements, the client and investment accounts are stored on disk 3 in a format corresponding to the display or printer output format seen by the user. The client account file format is shown in FIG. 8A. The format headings shown in the top left hand portion are as follows: REPORT, CLIENT, STATUS, RATES, THRESHOLDS, and BALANCES. The fields to the right of these headings are labeled in an essentially self-explanatory fashion (and will not be described in detail except as set forth below) to reflect the data which must be associated therewith. For example, with respect to the REPORT heading in the "TITLE" field, "Client Account File" would be inserted.

In FIG. 8A, the client's account number is inserted in the first field in the CLIENT heading. This field is utilized by the system software to access the client file. In the INITIAL PLAN field, the appropriate Plan A, B or C is inserted which identifies, among other things, the time period during which the client is committed to participate in the program. The INITIAL BAL field will of course reflect the initial amount of funds which the client is putting into the plan. The LAST ACTIVITY field in the CLIENT heading reflects the date of the most recent trip taken.

Below the client information, the client account format uniquely provides the control states of the control status words "VESTING", "BONUS" "PENALTY" and "IDENT", which reflect the client account current status as explained above. With respect to the RATES heading, the fields herein reflect the client account growth rate as defined above and the prevailing interest rate. In addition, the RATES heading includes LIMITS fields for both growth rate and interest rate which define the year-to-date minimum and maximum percentage values.

Turning next to the THRESHOLD heading, these threshold values may be used to readily determine whether the growth rate of any given client account exceeds fixed threshold values which will result in achievement of the 50%, 100%, 150% or 200% values for each of plans A, B and C. As indicated above, these thresholds are calculated by determining what the account balance should be based on a linearly declining balance from the initial entry into the plan until the five, ten, or fifteen years have expired. The first field under the THRESHOLD heading is DBAL which is the declining balance. This can be visualized as the value at a point along the line labeled "travel ceiling" in FIG. 3B which runs from the 100% initial investment point to zero dollars at the end of end years. The declining balance (DBAL) threshold is reduced by a fixed linear amount each month. Thus, for a client in the five-year plan, the declining balance will be reduced each month by 1/60th of the initial investment amount. The 50, 100, 150/200% thresholds are threshold balance figures that reflect the threshold balance necessary for a client to be on track for accumulating a 50, 100, 150/200% growth of his initial investment. These values are calculated based on the prevailing interest rate required to obtain a 50, 100, 150 and 200% return for each of the plans as reflected in the Growth Rate Thresholds shown in Table V below.

TABLE V

GROWTH RATE THRESHOLDS

| | TIMEFRAME | | RATE THRESHOLDS | | | |
|---|---|---|---|---|---|---|
| | WHOLE PLAN | EACH LEVEL | 50% | 100% | 150% | 200% |
| Plan A | 5 years | 1 years | 13.0% | 20.2% | 25.2% | 28.8% |
| Plan B | 10 years | 2 years | 6.4% | 10.1% | 12.6% | 14.5% |
| Plan C | 15 years | 3 years | 4.2% | 6.7% | 8.3% | 9.6% |
| Plan A | 60 months | 12 months | 1.083% | 1.683% | 2.10% | 2.40% |
| Plan B | 120 months | 24 months | .533% | .842% | 1.05% | 1.74% |
| Plan C | 180 months | 36 months | .350% | .558% | .69% | .80% |

The above table reflects threshold values for determining whether the growth rate of any given account exceeds fixed 50/100/150/200% thresholds for each plan A/B/C. These values are utilized for purposes of splitting the excess according to that plan between the appropriate client/company accounts, as will be discussed in detail below.

Following the THRESHOLDS heading is the BALANCES heading, which reflects the client's current account balance (VBAL) and an associated company balance (CBAL), which indicates the contribution of the client's account to the company account. Each of the balances which will be discussed below are associated with either VBAL or CBAL and are stored independently on three sets of data arrays, i.e., the running, milestone, and archival data arrays, which are shown schematically in FIG. 7. The running data array indexes the balances and dates on a monthly basis and stores such data for the current, last, previous and initial months. The milestone data array indexes the same balances and dates based on achievement of the levels shown in Table V. Finally, the archival data array indexes balances and dates on a yearly basis, which provides a convenient method, e.g., to generate end-of-fiscal year reports. Thus, by utilizing the data arrays shown in FIG. 7, an operator can access current balances for clients either based on the current month's performance, achievement of the first through the fifth level, or based on any desired year in the course of the program. It is noted that with respect to the running data array, the array is conveniently structured so that the current month's balances and dates in the updating cycle may be shifted to the last month's location in the array, while the last month's data may be shifted to the previous month's location. Similarly, in the milestone data array, when a client qualifies for advancement to a higher level, the balances and dates information are merely advanced to the location in the milestone data array for the next highest level.

In the BALANCE heading, VBAL reflects the client's all-important current balance. The "current" balance is updated on a continuing basis to reflect travel taken during the month. The "update" field represents the cumulative balance as of the previous update, i.e., as of the last month. If the PENALTY field is zero, the balance VBAL is equal to the sum of the values in the SPLIT, BONUS and EXCESS fields. The "penalty" field reflects the amount of operating costs or the penalty assessed to the client for his account falling below the 50% growth floor. The SPLIT field reflects that portion of the balance where the account is between the growth floor and the growth ceiling. As previously indicated, the excess over the growth floor is split evenly between the client and the company. The BONUS and EXCESS fields reflect the account rising above the 100% growth ceiling which may, for example, result in the client receiving free travel and the company receiving an increase in its capital reserve (BONUS zone). It is contemplated that the company will receive all the profits due to funds in the EXCESS zone.

The present invention contemplates associating checking account, borrowing, insurance and other privileges with the client's cumulative balance VBAL. By way of example only, the achievement of a predetermined balance in the BONUS field may be used to trigger associating a predetermined insurance policy benefit with the client's account.

The present system is designed so that when the client utilizes travel services under the plan, the funds are first extracted from the EXCESS field and then the BONUS, SPLIT and PENALTY fields, in that order, to cover the costs of the travel. The client account format also includes fields relating to company balances (CBAL). The total company balance (CBAL) is the sum of the field to the right, i.e., the sum of DEFICIT, SPLIT, BONUS and RESERVE fields.

The COMPANY balances are a reflection of the contribution that the client account balance has made to the company account. As shown in FIG. 4, the deficit field reflects the amount of funds the company needs to draw out of its reserve or profit margins to cover a client account which due to lower than expected interest rates, has fallen into the PENALTY zone. Company balances are incremented by virtue of the activity in the client balances. For example, if the client balances is above the 100% growth ceiling, then the bonus field of the company balances are incremented. Likewise, if the client account rises above the 150% level, then the RESERVE field is incremented accordingly.

The client account format also includes a CURRENT TRANSACTIONS field, which reflects the most recent five (5) trips taken by the client. By virtue of the current transaction data listed here, the system operator can perform a status check on any given account to determine the degree of recent usage. If desired, the client transaction field may be used to verify that the caller requesting travel usage is, in fact, the client by, for example, requiring the caller to identify the most recent trip(s) taken.

The transaction data may be designed to include trip related data at any desired level of detail. Each transaction is assigned a sequential transaction number and the total amount of funds expended on the trip is set forth in the field next to the transaction number. The trip related data recorded may, for example, include the day at which travel was initiated, the cities of departure and arrival, the level or class of hotels (or cars) utilized and charges related to each of these items.

The final entry in the client account file format is the CUMULATIVE QUALIFICATION heading. Under the cumulative qualification heading five achievement levels have been defined corresponding to vested amounts of the initial investment of from 10% to 50%. For example, in the 15 year plan, at the end of the first three years (or 36 months), the client account would be checked to determine whether the client is out of the penalty zone. If so, the client will have achieved the first level and the date of achievement and the cumulative balance as of the date of achievement will be recorded in the fields indicated. Upon achieving a particular level, it is contemplated that the company will take the funds vested and place them into a separate account to lock in that percentage of return to the client. If at the end of the three-year period, the client is in the penalty zone, then the penalty date is recorded and the client is not advanced to a higher level.

Figure 9B:
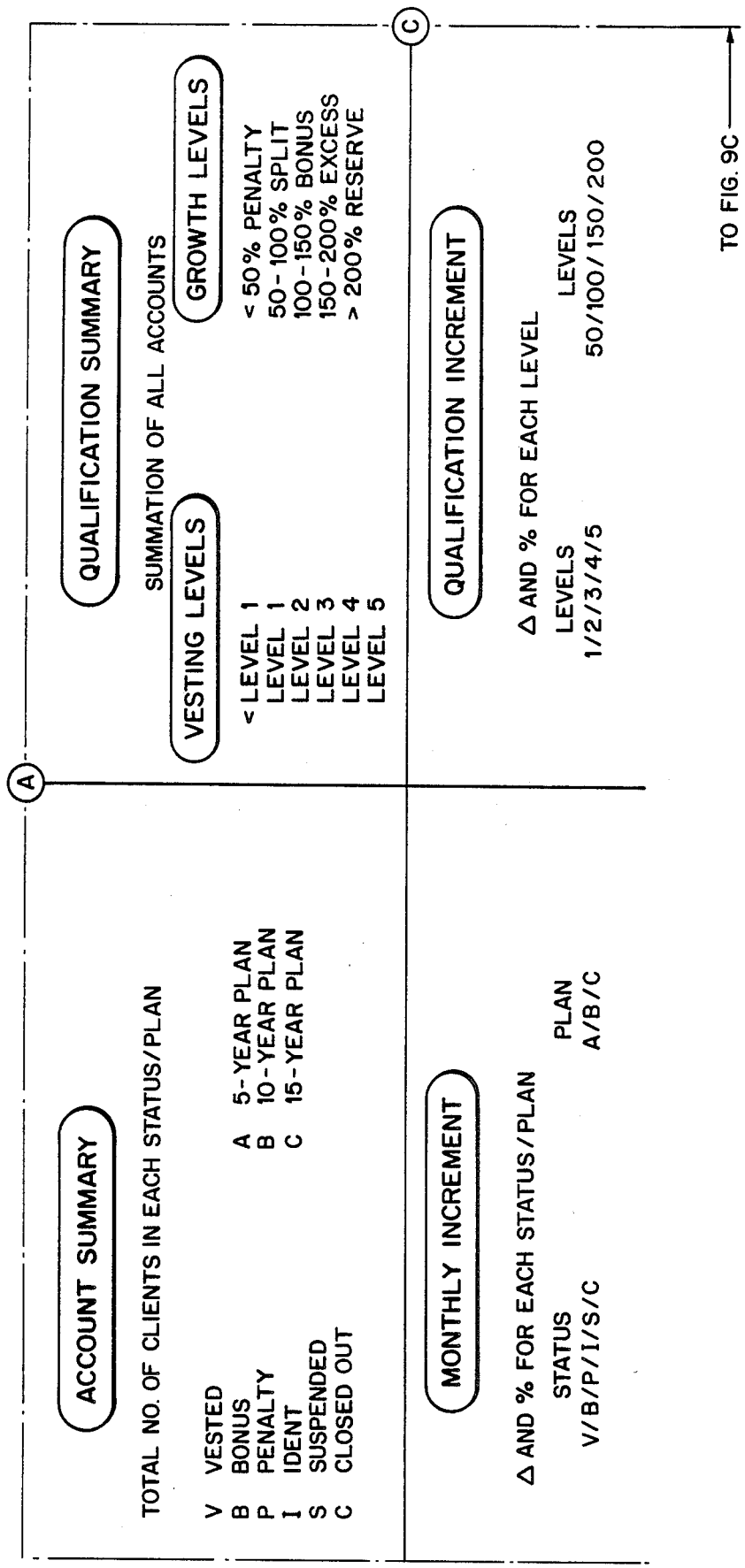
FIG. 9 is a representation of an exemplary investment file format.
Figure 9C:
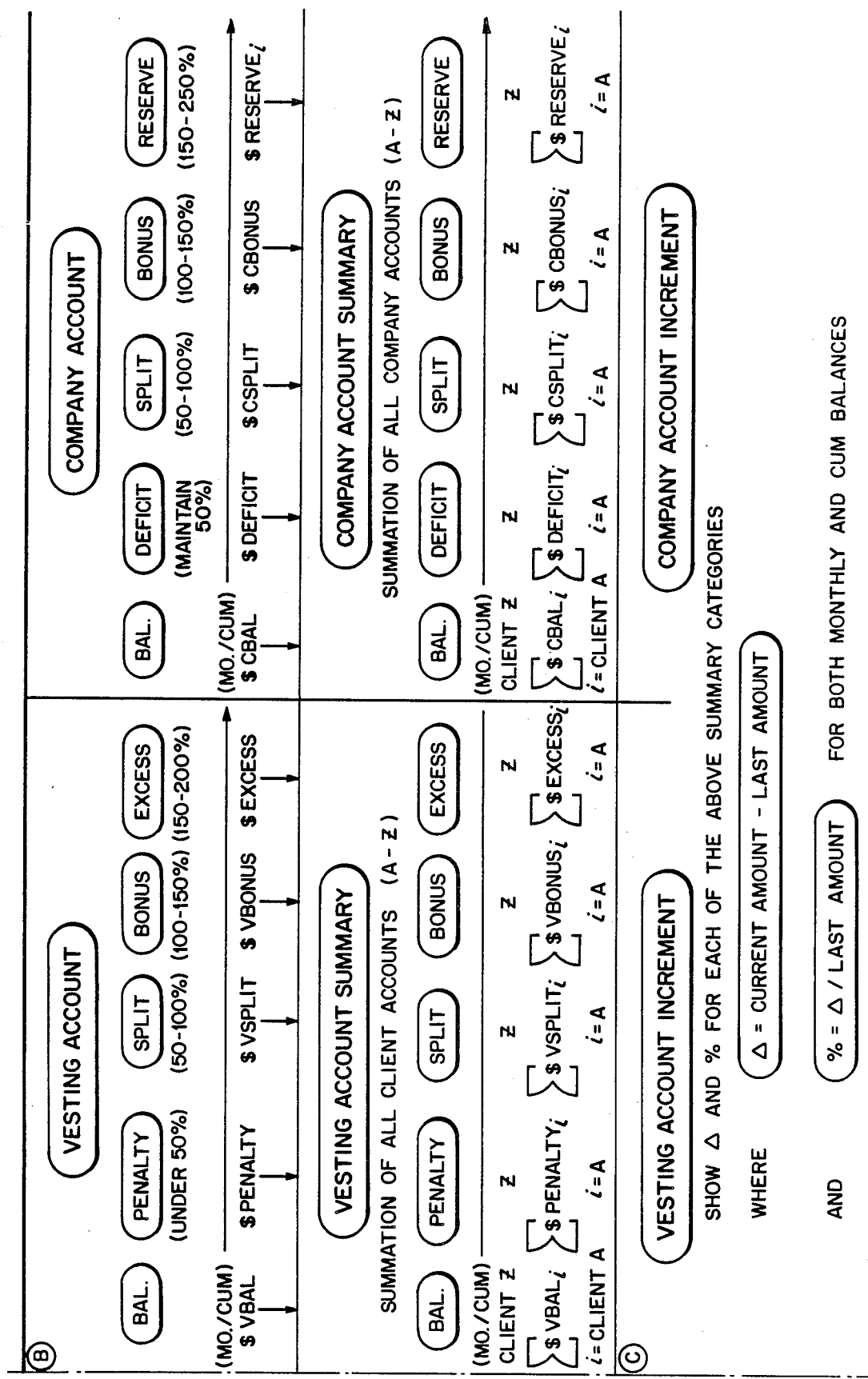

The investment account file format is shown in FIG. 9. This file reflects cumulative statistics for all clients who participate in the program. The REPORT, BANK, RATES and BALANCES headings contain fields which are largely self-explanatory and will not be explained in detail except as indicated below. The BANK (or investment, or brokerage house) heading provides for the entry of a plurality of account numbers associated with all the funds in the program. The RATES heading includes an INTEREST RATE field which reflects the prevailing interest rate from the bank of all the investment accounts. The GROWTH RATE field under the RATES heading reflects the growth rate of all the client accounts. The BALANCES heading identifies the investment account balance which is the total amount of funds in all the client investment accounts. Additionally, the total balance which is vested to various clients is maintained in the vesting account. The company account balance is the summation of all the client's company balances (CBAL).

Turning to the client summary record shown in FIG. 9, all the clients in the program are listed by number and name. The date which the client started in the program is listed and the initial plan subscribed to as well as the initial balance. In addition, for each client the status of the account is identified by its associated control status words indicating "vested", "bonus", "penalty", "identifications", "suspended" or "closed" out account status indicia respectively.

Under the qualification level heading for each client, the vesting level from level $\phi$ to level 5 is indicated as well as the growth rate and the declining balance (DBAL) from each client account.

The VESTING ACCOUNT and COMPANY ACCOUNT headings incorporate the vesting balance and company balance for each account in the system as reflected by the fields in the client account format described above with respect to FIG. 8A. The balances for both the vesting and company account reflect monthly and cumulative entries. The cumulative balance reflects the up-to-date cumulative balance total, whereas the monthly entry reflects the monthly increment or decrement that the account experienced during the previous month. In the ACCOUNT SUMMARY heading, the total number of clients in each status and in each plan is recorded. In the QUALIFICATION SUMMARY, a summation of all the accounts that have achieved the levels shown. Under the GROWTH LEVEL heading, the percentage of accounts in the listed growth levels are recorded.

As shown in FIG. 9, the VESTING ACCOUNT SUMMARY reflects a summary of all client accounts of all the balances shown above under the VESTING ACCOUNT heading. Likewise, the COMPANY ACCOUNT SUMMARY shows a summation of all the company account balances for all the fields shown under the COMPANY ACCOUNT heading above. Under the vesting account and company account headings the summary balances show both the cumulative balance as well as the monthly balance to reflect the cumulative totals as well as the performance during the last month.

The final data stored in investment account file are the monthly increment and the percentage change data for the ACCOUNT, QUALIFICATION, VESTING ACCOUNT and COMPANY ACCOUNT summaries. Under each of these increment headings, the "delta" change in the account is calculated based on the current amount minus the previous months amount, and the percentage (%) change based on the current amount minus the last amount divided by the last amount.

Figure 10B:
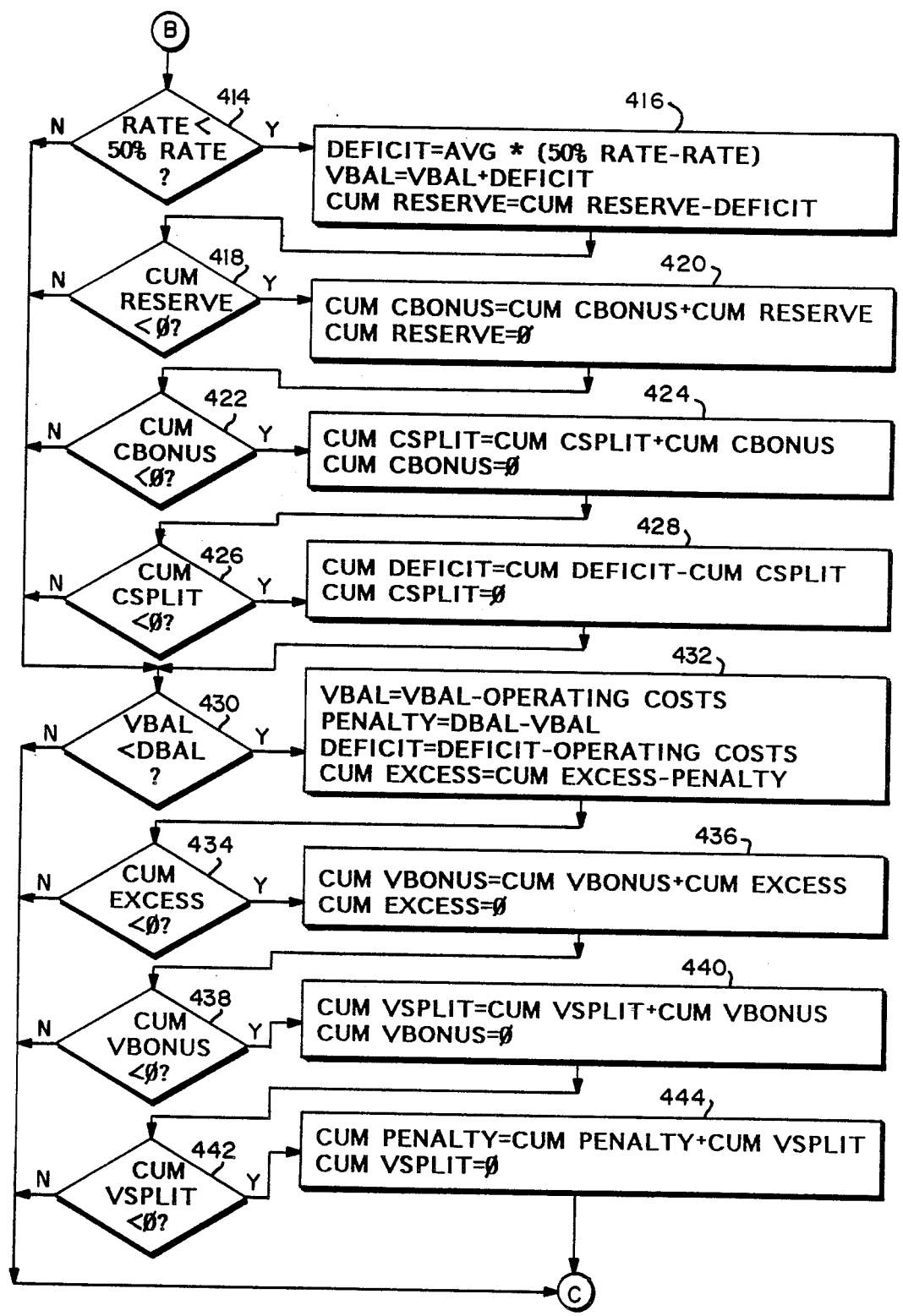
Figure 10C:
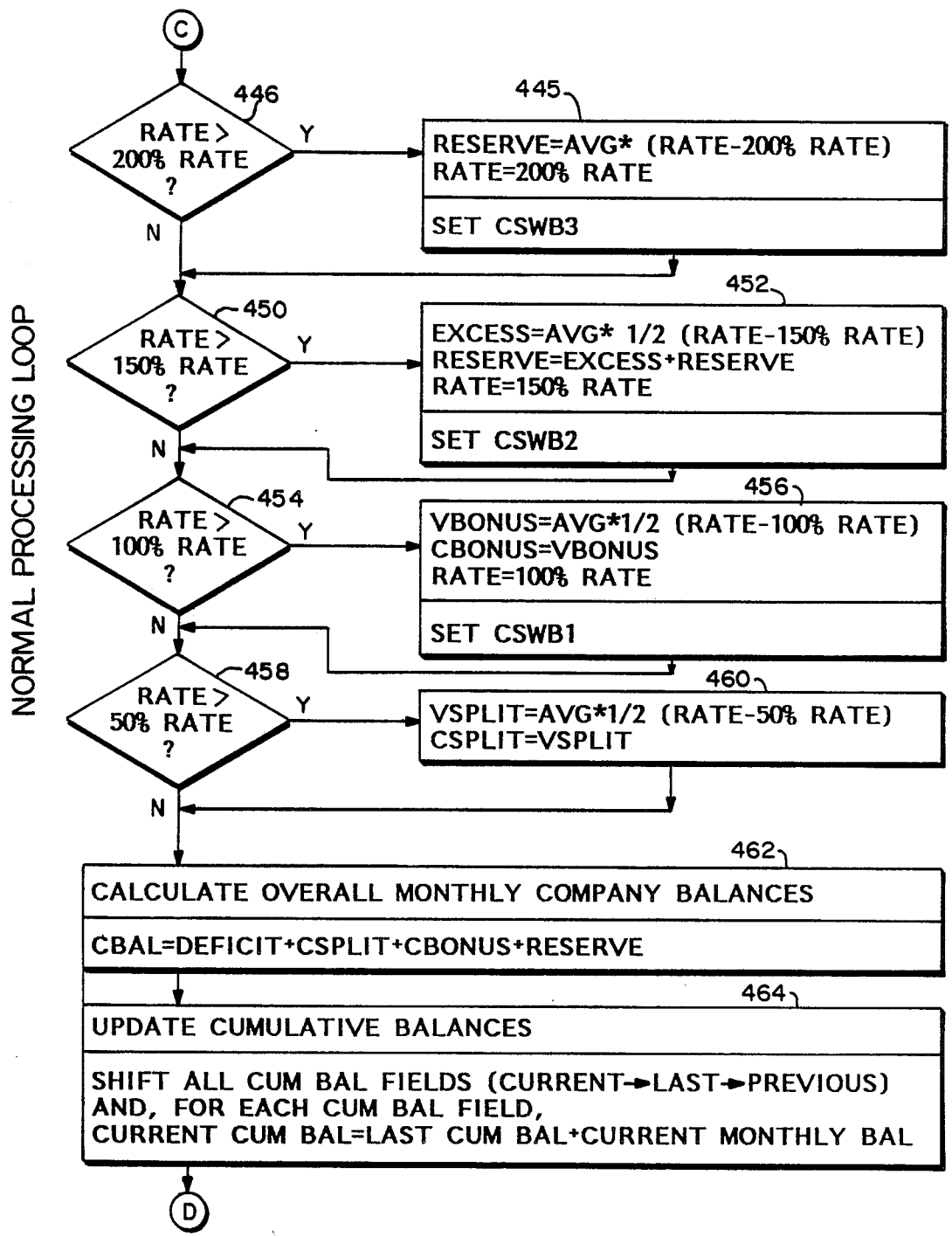
Figure 10C:
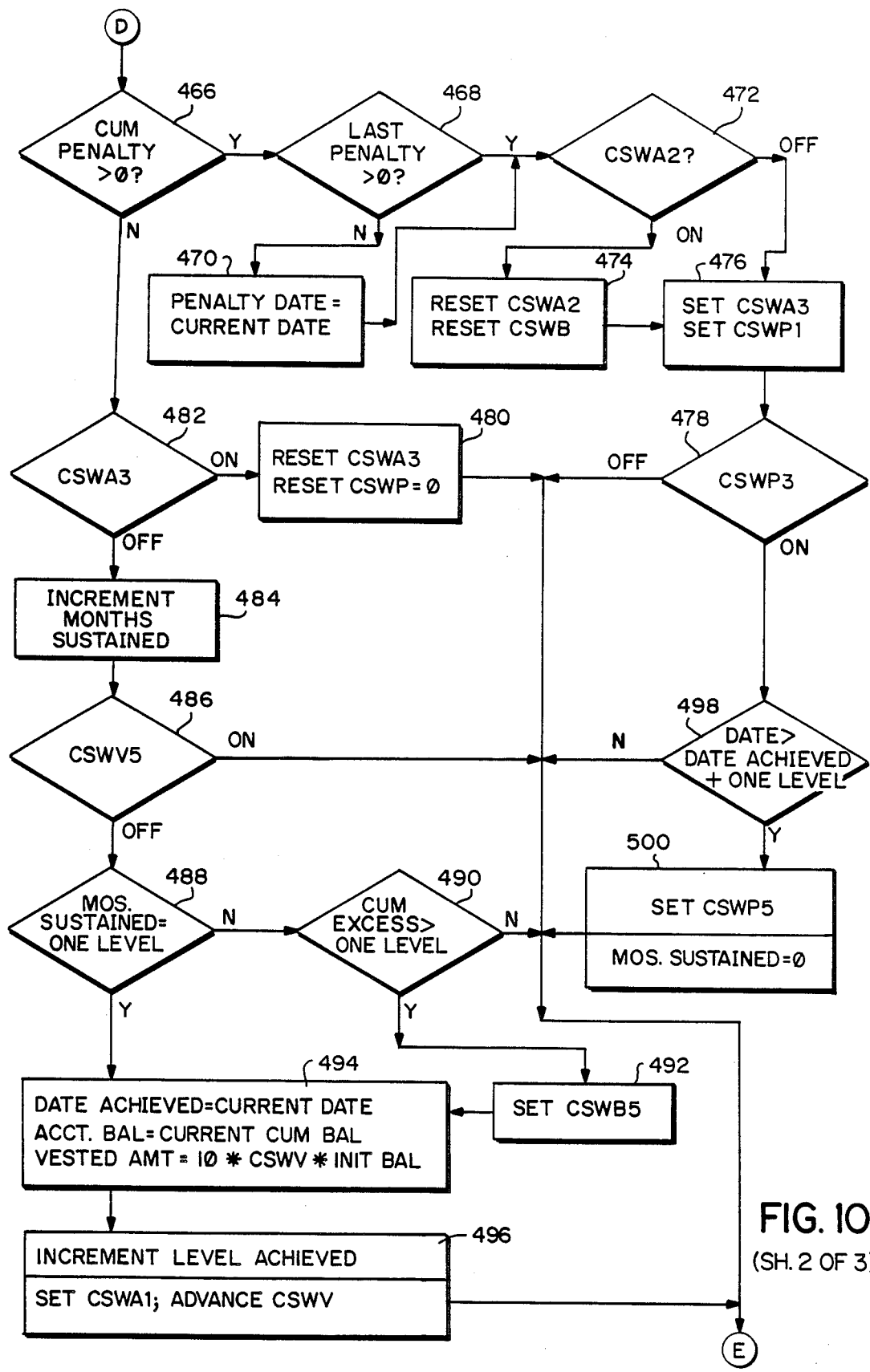

Turning next to the system software, a detailed exemplary implementation of the update client files routine (which is depicted in block form in FIG. 5), is shown in the flowcharts of FIGS. 10A through 10C. In interpreting the flowcharts which follow the definitions listed in the Flowchart Functions table below should be noted.

| FLOWCHART FUNCTIONS | |
|---|---|
| "ADVANCE" means - | reset current CSW bit set next higher CSW bit |
| "UPDATE" means - | (1) last value    previous value |
| | (2) current value    last value |
| | (3) new value    last value |
| and also, | (4) new low value    YTD MIN |
| for rates (if applicable) | (5) new high value    YTD MAX |
| "CSWX" means - | a particular one of the five control words (X = A/v/B/P/I) for each client account |
| "CSWX1-CSWX6" means - | a particular bit (1,2, . . . ,6) set ON or OFF within a given CSWX |
| "CUM" and "monthly" means | the cumulative value up to the last monthly update, and the monthly value since time (default is "monthly") |

Turning back to the flowcharts in FIGS. 10A–C, the functions accomplished by the update client files routine is depicted schematically in the monthly update portion of the logic flow diagram shown in FIG. 4. The update client file routine serves to update the client files on a periodic, e.g., monthly, basis. Each client file is updated on this periodic basis, regardless of whether any trips were taken during the past month.

Thus, each month the update client file routine is entered (400) and data required by the routine is retrieved and appropriately processed (402). More specifically with respect to block 402, the current prevailing interest rate is retrieved from the bank or financial institution 13 shown in FIGS. 1 and 2. The interest rate is then divided by 12 in order to get the monthly interest rate. The variable "days" is defined as being equal to the number of days in the current month, and the transaction file is sorted by client account number with respect to the transactions which took place during the previous month. The client account year-to-date minimum and maximum interest rate figures are then updated if the new interest rate impacts this field.

After the sorting of the transaction file, the account file for the next client is retrieved, as well as all the transactions for that client (404). As indicated at block 406, the average balance for the current month is that thereafter calculated. The cost of the travel transactions are figured into the average balance calculation by appropriately weighting the day of the month that the transaction occurred. In this regard, the formula shown in block 406 takes into account the $date_i$, (i.e., the day of the month that the transaction occurred), as well as the number of days in the month. Thus, if a transaction takes place on the first day of the month, the average balance during the month must be lower than if the transaction took place later in the month. Under such circumstances, the largest subtraction from the last balance would be taken into account.

Immediately thereafter, the monthly declining balance is calculated for purposes of making the account projections on a monthly and cumulative basis. The monthly declining balance is merely the initial investment base divided by the number of months in the plan. Thus, if the initial investment base is $10,000 and the client is enrolled in a 5-year plan, then the initial balance is $10,000 divided by 60 or $166.67. The current cumulative declining balance is defined as being the last declining balance minus the monthly declining balance (408).

In block 410, the interest rate thresholds for the 50%, 100%, 150% or 200% levels are set, depending upon the particular plan that the client is enrolled in. These rate thresholds are utilized to determine which of the previously discussed zones the client is currently in. Although these thresholds may be determined from calculations of the nature discussed above with respect to Table 2, for convenience, the growth rate thresholds at each of these levels for each plan are shown in Table V above. Additionally, in block 410, the interest rate is set to equal the monthly interest rate defined at block 402.

Thereafter, as indicated at 412, the routine shifts all the balance fields in the running data array shown in FIG. 7 from the "current" to the "previous" locations in order to provide the appropriate storage space for the generation of the "current" monthly balance fields (which are initially set to 0). The client's current balance is then calculated (VBAL) which is equal to the average account balance times the monthly interest rate.

With respect to the processing which follows, reference should be made to the client account file format shown in FIG. 8A and the specification associated therewith wherein the various fields are described. At block 414, a check is made to determine whether the interest rate is less than the rate required to sustain the account at the 50% growth floor target. If the interest rate is, in fact, less than the rate required to sustain the account at the 50% floor, then a "deficit" calculation must be made to determine how much funds must be supplied to the account by the company in order to place the account back to the 50% level. As indicated at block 416, a calculation is made to establish what this deficit amount actually is. After this deficit amount is calculated, the deficit (which may be provided, for example, by company RESERVE funds) is added to the client's vesting balance and the deficit amount is then subtracted from the company's cumulative RESERVE fund (which inures to the client's benefit).

It is noted, however, that there may not be funds in the company's cumulative reserve account to cover the deficit and a check for this condition is made at 418. The cumulative reserve may be less than 0 due to the subtraction of the deficit amount in 416 above. Thereafter, the cum CBONUS field is set to equal the sum of the current CBONUS field plus the cumulative RESERVE field (which may, in fact, be a negative number) and the cumulative RESERVE field is reset to 0 (420).

The cumulative BONUS field is then checked to see if it's less than 0 (422). If so, this indicates the BONUS field had insufficient funds to cover the deficit. Thereafter, as indicated in 424, the cum CSPLIT field is set to be equal to the sum of the cum CSPLIT and cum CBONUS fields and the cum CBONUS field is set to be equal to 0.

The cum CSPLIT field is checked to determine if it is less than 0 (426). By virtue of the checks at 418, 422 and 426, an effort is made to cover the deficit calculated in 416 from funds which have accumulated in the client's account. If no such funds are present, then the deficit is covered by the cum DEFICIT field, which reflects the company's contribution and the client's cum CSPLIT field is set to 0 (428). By this process, the deficit will either be totally absorbed by the company's RESERVE/SPLIT/BONUS funds, or else it will appear as a negative company DEFICIT for the client's account If a negative response is received from the checks at 414, 418, 422 or 426, or if the deficit is supplied from the cum DEFICIT field, a check is thereafter made at 430 to determine whether the client has gone over the travel ceiling discussed above as reflected by the linear declining balance DBAL. In this regard, the check at 430 indicates whether the client's current balance is less than the linear declining balance which would indicate that the client is operating in one of the previously defined penalty zones. As indicated at 432, if the client is operating in the penalty zone, an operating cost (or penalty fee) is subtracted from his current balance. The operating cost used to offset any company's deficit that may have accumulated (i.e., this may force the DEFICIT fields to go positive).

Blocks 434, 438 and 442 are checks to determine how this penalty amount will actually be subtracted from the client's account. In this regard, the penalty amount as indicated in block 432 is initially subtracted from the client's EXCESS fund field. If there is no cumulative EXCESS field, then the cumulative EXCESS field will be less than 0 and the check at 434 will cause the cumulative BONUS field (cum V BONUS) to be equal to the sum of the current cumulative BONUS field and the cumulative EXCESS field. If there are insufficient funds available in cum VBONUS as reflected by the check in 438, then the funds are taken out of cum VSPLIT. Thus, the routine steps through the fields which reflect the account funding to find a field from which the penalty assessed can be subtracted. If there are insufficient funds present in the cum VSPLIT field (442), then a further penalty is assessed as per block 444. Just as with the field resetting steps in blocks 420, 424 and 428 above, the cum EXCESS, cum VBONUS and cum SPLIT fields are appropriately reset to 0 by the routine in blocks 436, 440 and 444, respectively.

As shown in FIG. 10C, the routine in its normal processing loop calculates which fields in the client's account balances are to be incremented due to prevailing interest rates. In this regard, a check is initially made to determine whether the previously calculated rate is greater than the 200% rate as indicated by the growth rate thresholds Table V above. If the rate is above the 200% rate, then all the excess goes into the company's RESERVE as determined at 448. The amount in RESERVE is defined as the average balance times the rate which is over the 200% rate. The rate is then set at the 200% rate and the control status word CSWB3 is set to reflect the 200% level.

A check is then made to determine whether the rate is greater than the 150% rate (450). This check will likewise be made if the determination at 446 indicates that the rate is not greater than the 200% rate. If the rate is greater than the 150% rate, then an EXCESS variable is defined as the average balance times ½ of the rate over the 150% rate. The ½ factor reflects the fact that these funds are being split between the company and the client. The RESERVE field of the client's account is set then to equal the "excess" plus "reserve". The rate is set to the 150% rate and the control status word CSWB2 is set to reflect the 150% level (452).

If the check at 450 reveals that the rate is not greater than the 150% rate or after the processing at block 452, a check is made to determine whether the rate is greater than the 100% rate (454). If so, the client account file VBONUS field is set to equal the average balance times ½ of the excess of the rate over the 100% rate, the company's CBONUS field is set to be equal to the client's vesting VBONUS field, the rate is set equal to 100% and the control status word CSWB1 is set to reflect performance at the 100% level.

If the check at 454 indicates that the rate is not greater than the 100% rate or after the processing in block 456, a check is made to determine whether the rate is greater than the 50% rate (458). If so, VSPLIT is set to be equal to the average balance times ½ of the excess rate over the 50% rate and the company CSPLIT field is set equal to the client's VSPLIT field.

If the rate is not greater than the 50% rate or after the processing in block 460, the overall monthly company balances are calculated and the company balance CBAL is set to be equal to the sum of the DEFICIT, CSPLIT, CBONUS and RESERVE fields (462). As noted previously, besides calculating monthly balances, the system keeps track of cumulative balances which must be updated, as well. This is accomplished as indicated at block 464, where all cumulative balance fields are appropriately shifted (e.g., from the "current" to the "last" to the "previous" location in the running data array) and for each cumulative balance, the current cumulative balance field is set to be equal to the last cumulative balance plus the current month's balance.

After the cumulative balances have been updated, a check is made to determine whether the cumulative penalty amount is greater than 0 (466). If the cumulative penalty amount is not greater than 0 (which indicates that the client is not in the penalty zone), a check is made to determine whether the control status word defining the penalty zone is on (482). If so, then the control status word CSWA3 is reset and the penalty control status bits in CSWP are all set to 0. After processing in block 480, the client responses are retrieved from the response file at block 502, as will be explained hereafter.

If the check at block 482 indicates that the penalty control status word CSWA3 is not set, then as indicated at 484 the client's "months sustained" data is incremented and a check is thereafter made to determine whether the client is vested at the fifth vesting level (486) and, if so, block 502 is entered. If the check at 486 indicates that the client is not at the fifth vesting level, then a check of the client's months sustained is made to determine whether the client has reached a new level (488). If not, then a further check is made to determine whether the funds in the client's cumulative excess field are greater than a predetermined amount required to automatically advanced one level (490).

If the funds in the cumulative excess field are sufficiently high, then the control status word bit CSWB5 is set, indicating that the system has advanced the account by one level. The date achieved, the account balance, and the vested amount data are updated to the current status (494). Thereafter, the level achieved is incremented, the vesting CSW is advanced, and the vested control status word CSWA1 is set (496). The system then enters block 502.

Turning back to block 466, if the cumulative penalty amount is in fact greater than 0, then a check is made at 468 to determine whether the last penalty amount is greater than 0, as reflected by the "last" data array (468). If the last penalty amount was not greater than 0, then the penalty date is set to equal the current date (470) and a check is made to see whether the bonus control status word CSWB is on or off (472). If the check at 472 indicates that the CSWA2 is on, then CSWA2 is reset and the bonus CSW bits are set to 0. Thereafter, the penalty control status words CSWA3 and CSWP1 are set.

At block 478, a check is then made to see whether the control status word CSWP3 is set, which indicates that the client is "projected out" of parameters to reach the next level at the expected date, due to his excessive travel usage. CSWP3 is If CSWP3 is on, then a check is made to determine whether the current date is the date at which the client's qualification level should be advanced one level (498). If so, then the control status word CSWP5 is set, which indicates that the client is denied the advance to the next level and the months sustained is reset back to 0 (500), after which block 502 is entered.

In block 502, the client's responses are retrieved from the previously described response file. Thereafter, a check is made to see whether, in fact, there was a response from the client (504) and a further check is made to determine whether the client ID has been confirmed by the client (506). If so, then the control status words CSWA4, CSWA5, and CSWI are reset to indicate that the problem with client identification has been resolved. If the client ID is not confirmed at 506, then a new account is set up for the client and a message is generated indicating that the account has been transferred (508). Thereafter, the control status word CSWI6 and CSWA6 are set to reflect that the account has been transferred and the current account has been closed out (510). Eventually, accounts in this "transferred" status can be surged from the system, after appropriate archival records are stored on tape.

After the processing in blocks 510, 512 or if a negative response is received at 504, a check is made to determine whether the client has requested the account to be closed (514). If the client has, in fact, requested account close-out, a check is made to determine whether the client is in the penalty zone, as reflected by CSWP1 (516). If so, a deduction is made from the client's balance as an early withdrawal penalty (518). Thereafter, the control status word reflecting cashed-out status is set (524), a message is written indicating that a penalty has been deducted (526) and a further message is written indicating that the account is closed out with a balance equal to the vesting account balance (528). Thereafter, the control status words reflecting the closed-out and cashed-out status are set (530). Eventually, accounts in either these statuses can be purged from the system, after appropriate archival records are stored on tape.

Turning back to the check at 516, if CSWP1 is off, then a check is made at 520 to determine whether the client is in the bonus zone, as reflected by CSWB1. If the client is in the bonus zone, then CSWB6 is set to reflect cashed-in status and the functions of blocks 528 and 530 are performed. If the check at 520 indicates that CSWB1 is off, then the 528 and 530 functions are directly performed.

After the functions indicated at 530 are performed or if the check at 514 indicates that the client has not requested an account close-out, a check is made at 532 (see FIG. 10A), as to whether the account file is at the end-of-file and, if so, the routine is exited (534). If the end-of-file has not been reached, as indicated by the check at 532, then the account file for the next client Y is retrieved (404). The processing then continues until all client files have been updated.

Figure 11:
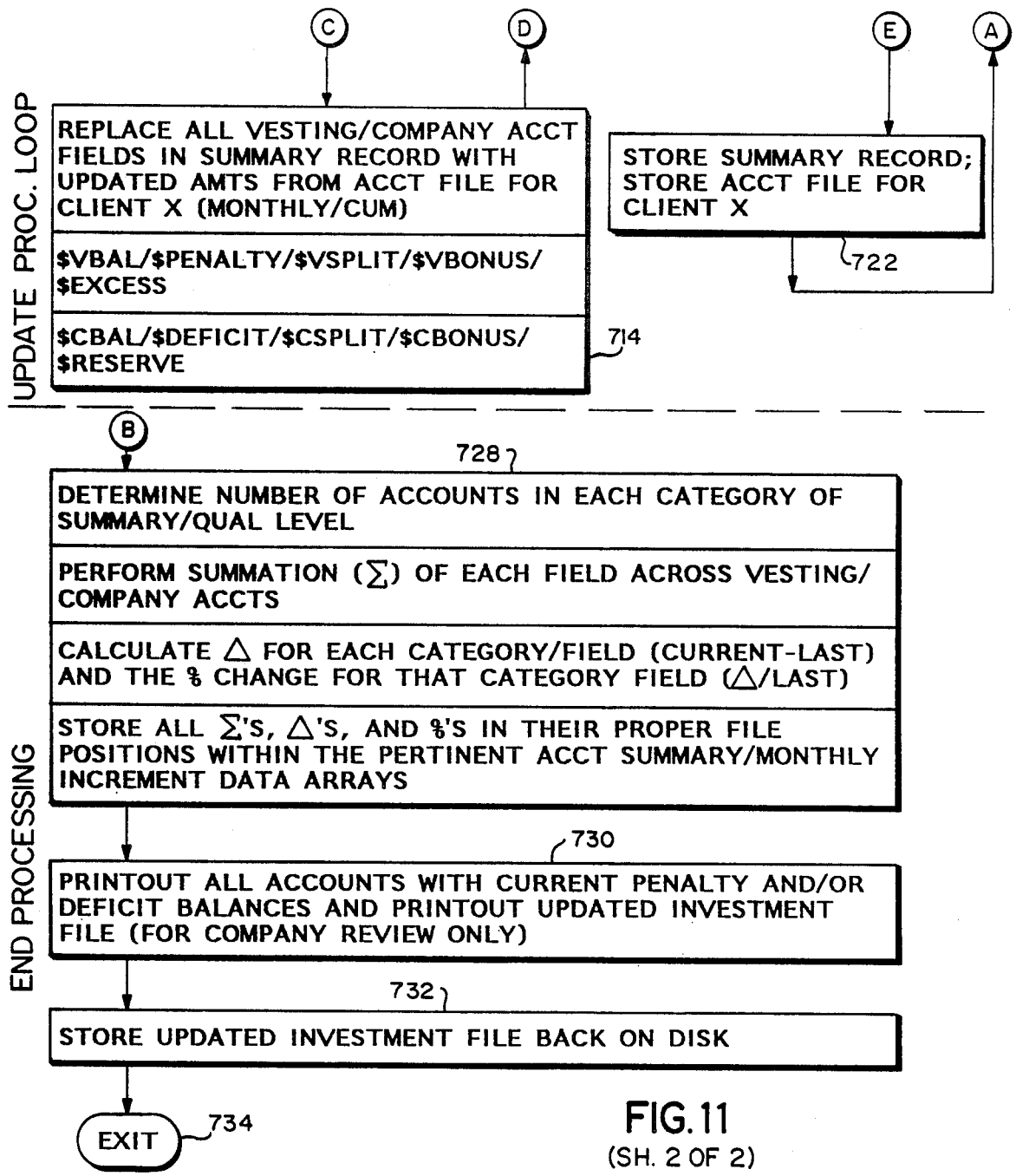
FIG. 11 is a flowchart delineating the sequence of operations performed by the update investment file routine.
Figure 12:
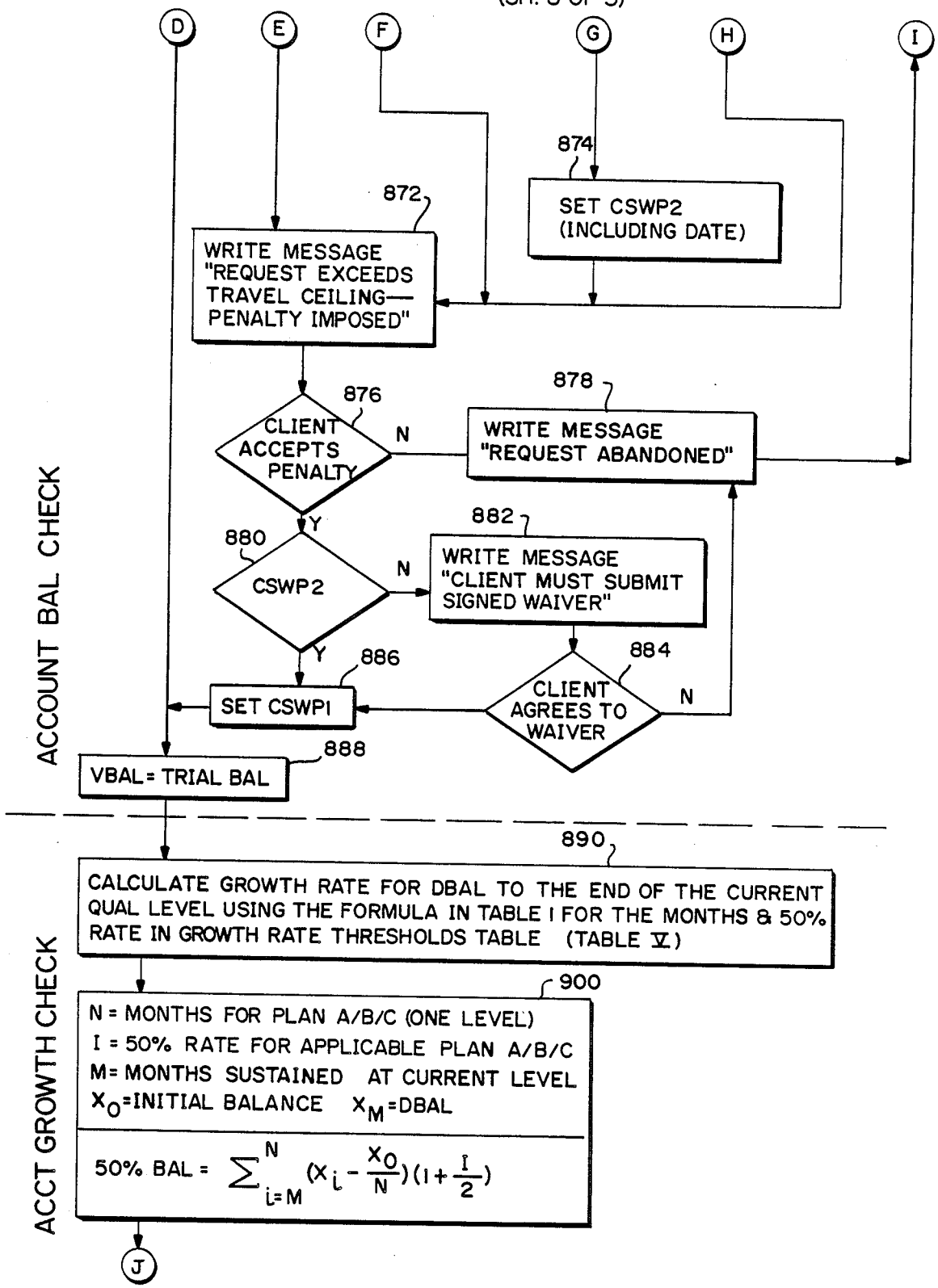
FIGS. 12A-C are flowcharts delineating the sequence of operations performed by the process travel request routine.
Figure 12:
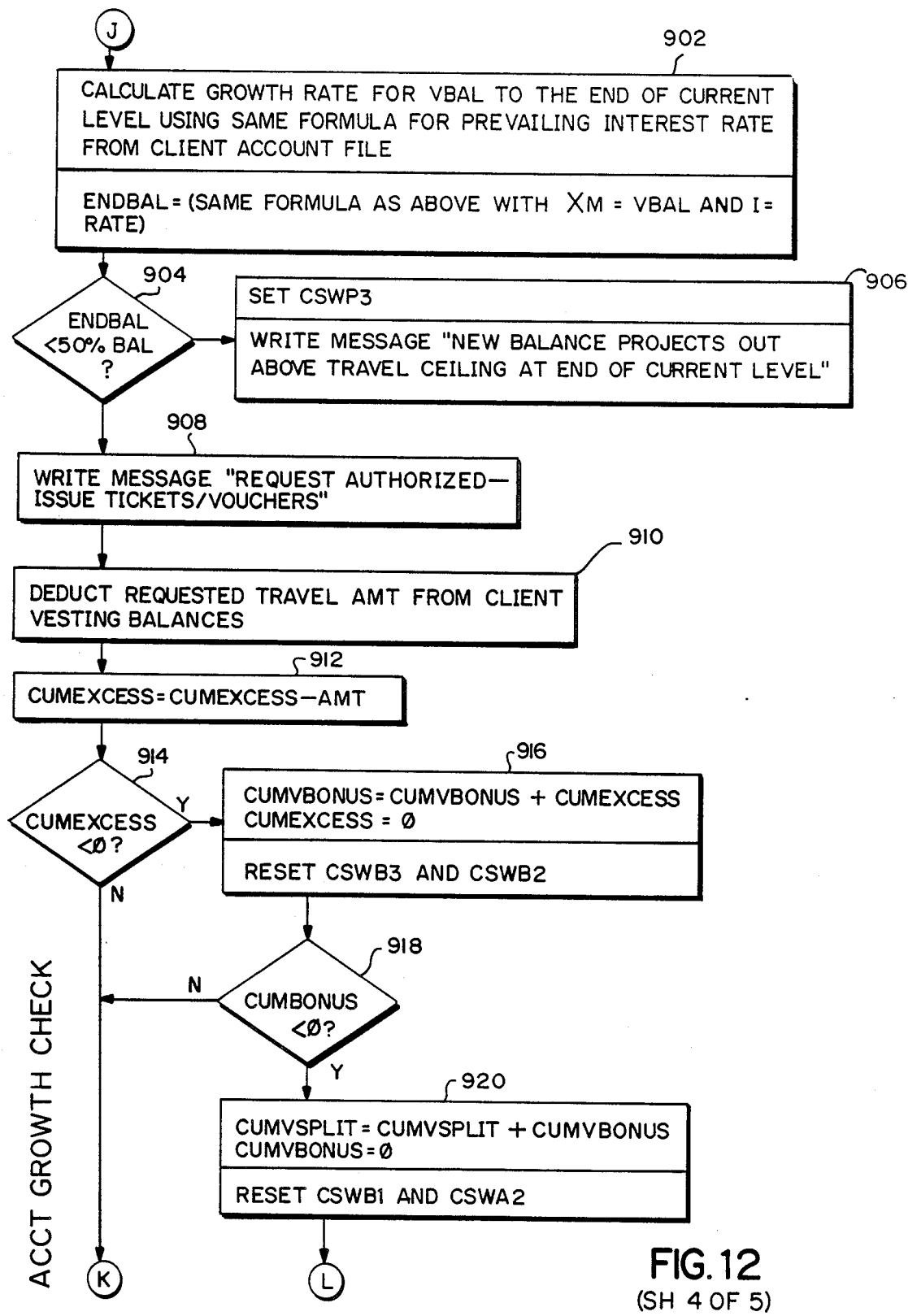
Figure 12:
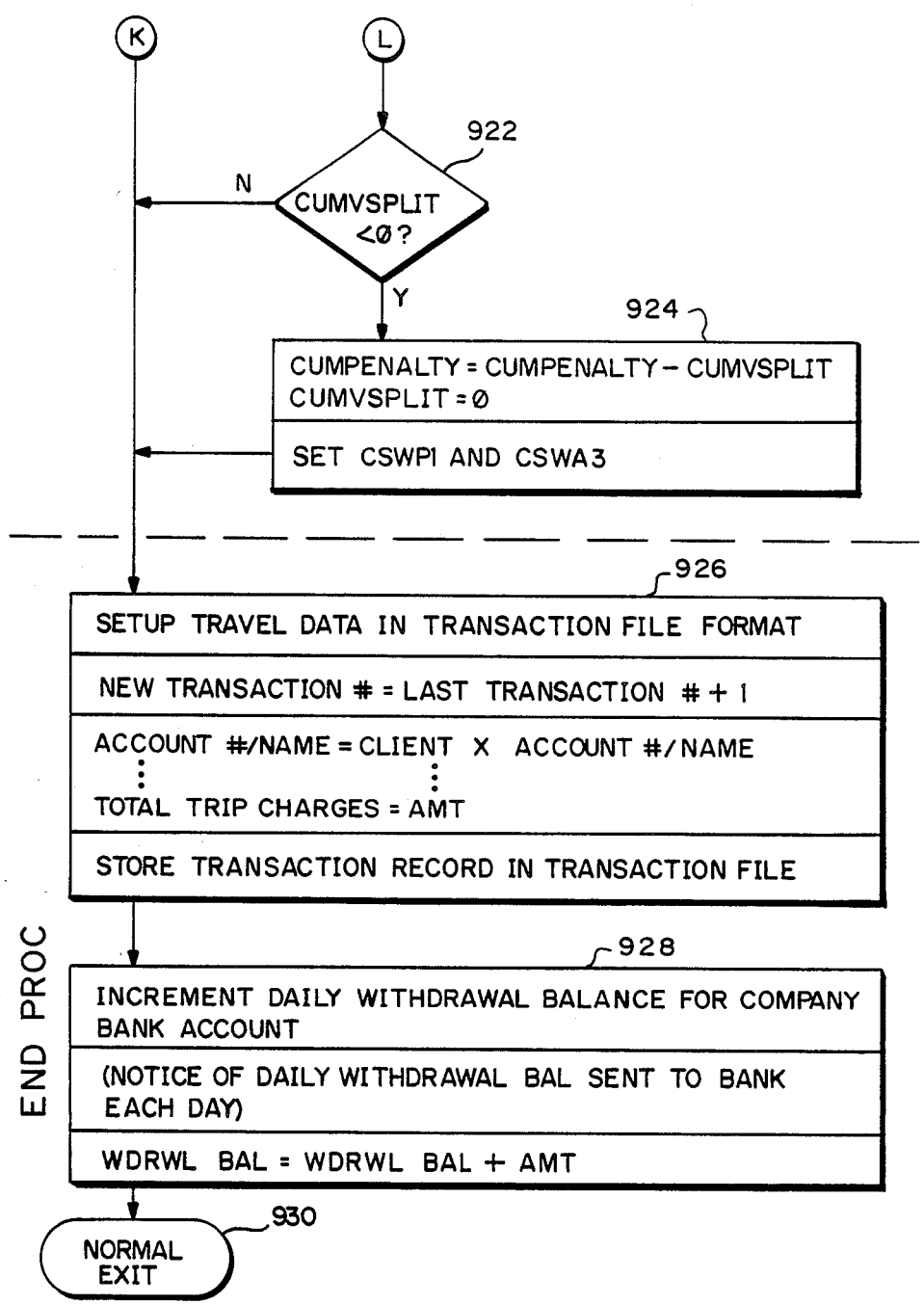

Turning now to the update investment file routine shown in FIG. 11, this routine is entered by retrieving the investment file from the disk 3 (700, 702). The investment file includes summary records for each client as well as the summary information relating to the overall travel program. To update all the required investment file information, the routine retrieves the account file for the next client X (704) and steps the previously retrieved investment file to the next client summary record (see FIG. 9) for the next client (706).

A check is then made to determine if client X has his own summary record (708). If client X does not have a summary record, then this indicates that the client is new to the system and a new client summary record must be constructed and inserted into the investment file client summary record field (710). After constructing the new record for client X, the system is then advanced to this record by virtue of block 706.

The check at block 708 is again made to determine if client X is in the summary record. Since client X now has his own summary record a "yes" output will be generated which will cause entry into the update client summary record loop (712). In block 712, the account's status is set to equal to CSWA which, indicates the "vested", "bonus", "penalty", "identification", "suspended" or "closed out" status. The variable QUAL LEVEL is then set to equal CSWV which, as per Table IV, indicates which qualification level the client is currently at. The qualification rate is set to equal the growth rate discussed previously. Finally, the qualification balance is set to the declining balance which is shown under the QUALIFICATION LEVEL heading in the investment account format and was discussed above with respect to the client account format. It is contemplated that other variables may be updated in block 712 as well, for example, the interest rate received from the bank.

With the current status of such variables updated, the routine replaces all vesting and company account fields in the summary record with updated amounts retrieved from the individual client account file previously discussed with respect to FIG. 8. The specific account fields which are updated are listed in block 714. A check is then made at block 716 to determine whether client X is in the penalty zone. If client X is in the penalty zone, then a record is kept of that client's summary record in a temporary file for later printout (718). If the client is not in the penalty zone, then a check is made to determine whether the corresponding company account is in a deficit (720). If the company account is in deficit, then a record of such is also stored in the temporary file. By virtue of this record, a mechanism is established for the company to readily determine all clients having an account in the penalty zone (due to the client's excessive travel usage) and all accounts which are operating at a deficit (due to low prevailing interest rates). Thereafter, all the saved summary records are stored back on the disk (722) and the account file is retrieved for the next client (704) after a check is initially made to determine whether the account file is at the end of file (724). If the client account file is at the end of file, then a next check is made to determine whether the files for all clients A through Z have been processed (726).

After all client files have been processed, an end processing routine is entered (728). In the end processing, the account summary and qualification summary information is determined (see FIG. 9). In this regard, the number of accounts which fall into each category shown in the account and qualification summaries are tabulated. A summation of each field across the vesting and company account headings is performed. Thereafter, the change in each of the categories and fields are calculated by taking the current amount and subtracting the last amount and the percentage change for that category or field is likewise calculated. Thereafter, all the summations, changes and percentage changes are stored in their proper file positions within the pertinent account and monthly data arrays. Thereafter, as indicated at 730, all accounts are printed with current penalty and/or deficit balances for company review to determine what action, if any, must be taken for such accounts. Thereafter, an updated investment file printout is generated for the company's review. The updated investment file is thereafter stored on disk (732) and the routine is exited (734).

Turning now to the process travel requests routine shown in FIG. 12A, this routine implements the travel on demand section of the flowchart shown in FIG. 4 and, as will be seen below, involves interaction with an operator. The process travel request routine is entered at 800 and its action is initiated by reading an account number from an operator terminal after an operator has keyed in the client account number (802). Based on the client account number, the routine retrieves the client account file from disk 3, the client ID number from the ID file, and any client responses from the response file (804). A check is then made at 806 to determine whether the account is in a suspended status. If the control status word, CSWA5, is on, then a check is made to determine whether the client has submitted an ID response (808). If the client has not submitted an appropriate ID response, then a message is written indicating that the account is suspended pending an ID response (810) and the routine is exited immediately (812).

If the client did submit an appropriate ID response, then the control status word bits reflecting an identification problem and an account suspension are reset and all the bits in the identification control status word CSWI are set to 0 (814). Thereafter, a check is made to see whether the client's medallion card had been accepted (816). If the ID is not accepted (e.g., the card appears to look counterfeit), then the control status bit, CSWI4 is set, indicating that the client's ID has been rejected (818). If the medallion card is accepted by virtue of a travel agent's visual inspection, then a further check may be optionally made at 824, e.g., a second identification card check.

If the second ID is rejected, then the ID rejected bit CSWI4 is set (818) and the control status word bits CSWA5 and CSWI5 are set to reflect an account suspended status and as ID confirmation requested status condition, respectively. A message is also transmitted indicating that identification must be confirmed by the client in writing (820). Thereafter, the control status bit CSWA4 is set to reflect that there is an identification problem (822) and the routine is exited at error exit 812.

Turning back to the ID check at block 824, if the second ID is accepted, then the client identification number is read from terminal 9 (826). If desired, for security purposes, the client's ID number may be scrambled or encrypted by techniques which will be apparent to those skilled in the art. Thereafter, the ID number submitted by the client is compared with the file ID number (828). If the ID's match, then a check is made to determine whether the control status bit CSWA4 has been set (844) indicating an identification problem. If so, then due to the matching ID's, this control status bit is reset and the control status word CSWI is set to 0 to reflect the absence of an identification problem (846). If the check at 844 indicates that the ID status bit was off, then a message is written at 848 indicating that the travel request may be entered.

Turning back to the check at 828, if the client's submitted ID number does not match the file ID number, then a check is made to determine whether the control status bit CSWI1 is on or off, reflecting whether this is the first client-submitted ID (830). If the client had previously made a first incorrect attempt at transmitting the ID, then the client is given a second and third chance to submit a correct ID as reflected by blocks 832 and 834. If the control status word CSWI1, CSWI2 and CSWI3 checks reveal that these bits are off, then the bits are set by virtue at blocks 836, 838 and 840, respectively. A message is then written indicating the incorrect ID problem, (842), the control status bit CSWA4 reflecting an identification problem is set and the routine is exited. If the check at 834 reveals that the control status word CSWI3 indicative of a third attempt to submit a correct ID is on, then block 820 is entered, resulting in the message being written that the ID must be confirmed in writing by the client.

Presuming that a message is written that the client may enter a travel request, the client has passed all the identification hurdles and is ready to have his travel request processed. In order to determine whether the client's travel request will be accepted, a variable "TRIALBAL" is defined which is utilized to determine whether the travel request is accepted. As the the travel request data is entered, the amount or total cost of the travel request including air fare, hotel, etc. is determined (850). The trial balance is then defined as being equal to the client's cumulative balance (VBAL) minus the amount (AMT) or total cost of the travel request (852). Thereafter, a check is made at 854 to determine whether the trial balance is less than 0. If so, messages are generated that the request exceeds the available balance (856) and that the travel request is denied (858). Also, the associated control status word bit CSWP4 is set (858) and the routine is exited (860).

If the trial balance is not less than 0, then a check is made at 862 to determine whether the trial balance is less than the declining balance. If the trial balance is in fact less than the declining balance, this indicates that the client has exceeded his travel ceiling and has entered into the previously discussed penalty zone. If the trial balance is such that the client will be in the penalty zone, then a check of control status word bit CSWP1 is made to determine whether the client is for the first time entering into the penalty zone (864).

If CSWP1 is not "ON", then a message is written that the request exceeds the travel ceiling requiring imposition of a penalty (872). A check is made at 876 as to whether the client will accept the penalty imposed and, if not, a message is written indicating that the travel request has been abandoned (878) and the routine is exited (860). If the client indicates that he will accept the penalty, then a check is made at 880 to determine whether a signed waiver has been received, as reflected by CSWP2. If not, then a message is written that the client must submit a signed waiver (882). Thereafter, a check is made as to whether the client will agree to the waiver at 884 and, if not, a travel request abandoned message is generated (878). If so, or if the check at 880 indicates that a signed waiver has been received, then control status bit CSWP1 is set to reflect entry into the penalty zone.

Turning back to the check at block 864, if the control status word bit CSWP1 has previously been set, then a check is made at 866 to see whether the client has earlier signed a waiver and, if not, a further check is made is determine whether the client has just recently submitted a waiver at 868. If so, CSWP2 is set and the date of receipt is recorded (874). After setting CSWP2 at 874 or if the check at 866 indicates that CSWP2 has already been set, then a "request exceeds travel ceiling —penalty imposed" message is displayed. If the check at 868 indicates that the client has not yet submitted a waiver, then a further check is made to determine whether one month has elapsed since the client was asked to submit a signed waiver. If so, a message will be written that the client has not yet submitted a waiver (871) and a "request denied" message will be generated. The "travel denied" control status bit CSWP4 is set (858), after which the routine will be exited. If the check at 870 generates a negative response, then the message indicated at 872 will be generated.

Thereafter, the client's cumulative balance (VBAL) is set to be equal to the trial balance, indicating that the travel request has been approved (888). Beginning at block 890, a calculation is initiated to determine whether the client account is projected at the end of the current qualification level to be off the track for the client to receive at least the 50% minimum return on the initial investment. In essence, this calculation serves as an early warning to the client that, if he proceeds at his current rate, his excessive travel usage will preclude achieving a predetermined expected rate of return.

Thus, as indicated in block 890, the growth rate is calculated for the declining balance to the end of the current trial level using the formula in Table 1, which is shown in block 900, for the "months" in the 50% rate and the growth threshold rate shown in Table V. Thus, as per block 900, the equation shown is calculated, where N is set to be equal to the number of months of the plan which the client is enrolled, I is equal to the 50% rate for the applicable plan as reflected by the growth rate table, M is equal to the number of months sustained at the current level entry in the client account format, $X_O$ is equal to the client's initial investment and $X_M$ equals the declining balance, for the current month, all values being stored in the client account file format. Thus, the 50% balance is calculated by summing the months from the current month sustained to the nth (or the last) month in the program using the formula which has been previously discussed.

Thereafter, at block 902, a similar calculation is made but not with DBAL, (the declining balance indicative of where the client should be if travel usage declined linearly) but rather the client's actual balance (VBAL) using the same formula as above and using the prevailing interest rates from the client account file. Thus, an end balance is calculated, where $X_M$ is set to be equal to the client's actual balance and the interest rate reflects the current prevailing interest rate, (as opposed to reflecting the interest rate required to generate the 50% growth rate) which may well be above the 50% growth rate level.

As indicated at block 904, a check is then made to determine whether the calculated ENDBAL is less than the 50% balance. If so, then a message is written to the client indicating that the new balance "projects out" above the travel ceiling at the end of the current level, and the control status bit CSWP3 reflecting that the client "projects out" is set (906). If the check at 904 indicates that the end balance will be greater than the 50% balance, then a message is written "request authorized —issue ticket/vouchers" (908), implying that the client has cleared all hurdles to honoring his travel request.

After the "travel request authorized" message is generated, the process travel request routine deducts the requested travel amount from the client's vesting balances (910). This deduction from the client's vesting balances is done by first setting a cumulative cum EXCESS field to be equal to cum EXCESS minus the travel expenditure (AMT). It is noted that the processing steps which immediately follow are searching for a field in the client account balance heading which has sufficient funds to cover the travel request. Thus, a check is made at 914 to determine whether the cum EXCESS amount is less than 0. If so, then the cum V BONUS field is set to be equal to the cum V BONUS plus the cum EXCESS. The cum EXCESS field is set to be equal to 0 to reflect the check at 914 and the bonus control status bits CSWB3 and CSWB2 are reset (916).

Thereafter, a check is made to determine whether sufficient funds are present in the client's cum V BONUS field by determining whether cum V BONUS is less than 0 (918). If this field is less than 0, then the variable is set to be equal to cum V SPLIT plus cum V BONUS, the cum V BONUS field is set to be equal to 0 to reflect the test at 918, and the bonus control status bits CSWB1 and CSWA2 are reset (920). A check is then made as to whether the cum V SPLIT field has sufficient funds to cover the travel amount by determining whether the cum V SPLIT is less than 0 (922). If so, then the cum V PENALTY is set to be equal to cum V PENALTY minus cum V SPLIT, cum V SPLIT is set to equal to 0 to reflect the test at 922, and the penalty related control status bits CSWP1 and CSWA3 are set.

If the tests at 914, 918 or 922 are negative or after the processing step at 924, the travel data in the transaction file is set up as per block 926. In regard to this travel data, a new transaction number is assigned which is the last transaction number incremented by 1. In addition, the account number and name and total trip charges are entered into the transaction file the total transaction record is stored in the transaction file.

In order to cover the costs of the travel, the company's account has its withdrawal balance incremented by virtue of a notice of withdrawal which is transmitted to the bank on a daily, or other periodic basis. The new withdrawal balance is set equal to the previous withdrawal balance plus the total trip charges for the day (928) after which the routine is exited.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An air travel tracking data processing system comprising:
   data entry means for entering air travel related data and client identification data, said air travel related data including air travel usage data;
   memory means for storing instructions and for storing travel related data in a plurality of client account files, each of said client account files containing an indication of the amount of funds available for travel and client investment growth related data;
   control means for executing said instructions and for processing said data, said control means including means for associating said entered air travel related data with a corresponding one of said plurality of client account files in accordance with said client identification data, and means for updating client account files in accordance with said entered travel related data for maintaining cumulative travel related data in each of said account files;
   said means for updating including means responsive to said entered travel related data for updating said indication of the amount of travel funds available in a corresponding one of said account files in accordance with travel usage data and said investment growth related data.

2. An air travel tracking data processing system according to claim 1, wherein said data entry means includes means for entering initial investment base related data associated with said accounts.

3. An air travel tracking data processing system according to claim 2, wherein said means for updating said investment base related data is further responsive to prevailing interest rate data.

4. An air travel tracking data processing system according to claim 2, further including means for determining threshold account balances necessary to achieve a predetermined return on the initial investment base and for storing indicia in said account files related to achievement of a predetermined return on the initial investment base.

5. An air travel tracking data processing system according to claim 2, wherein said control means includes means for monitoring client account investment base fluctuations over time and for determining the current client account progress towards achieving a predetermined investment return.

6. An air travel tracking data processing system according to claim 5, further including means for storing in at least one of said client account files indicia responsive to prevailing interest rates and travel usage for determining the amount of funds by which a client investment base is to be modified based on such travel usage and prevailing interest rates; and means for determining in response to such travel usage and prevailing interest rates, the amount of funds to be targeted or withdrawn from at least one associated separate account, whereby the balance in at least one associated company account is varied depending upon client account performance.

7. An air travel tracking data processing system according to claim 2, further including means for monitoring the updated investment base related data associated with at least one of said client account files and for comparing said data with predetermined growth rate threshold related indicia.

8. An air travel tracking data processing system according to claim 7, further including means responsive to said comparison for updating and modifying the account investment base indicia.

9. An air travel tracking data processing system according to claim 1, wherein said data entry means includes means for entering participation time period related data defining a predetermined length of time a client is scheduled to participate in the travel program.

10. An air travel tracking data processing system according to claim 1, wherein said data entry means includes means for entering a client travel request;
said control means including means for selectively granting said travel request; and
means responsive to said means for selectively granting for decrementing said amount of travel funds available.

11. An air travel tracking data processing system according to claim 10, wherein said means for selectively granting includes means for verifying the clients' identification.

12. An air travel tracking data processing system according to claim 10, wherein said means for selectively granting includes means for analyzing the travel request and for projecting what the client account status will be as of the end of a predetermined time period if the request is granted.

13. An air travel tracking data processing system according to claim 12, wherein said means for analyzing and projecting includes means for comparing data relating to a client's actual travel usage with threshold data targeted to guarantee a predetermined return of investment.

14. An air travel tracking data processing system according to claim 1, wherein said data entry means includes a keyboard and a display means, whereby an operator enters travel related data received via a telephone line.

15. An air travel tracking data processing system according to claim 1, wherein said data processing system further includes at least one modem and said data entry means includes terminal means connected to said memory means via said at least one modem.

16. An air travel tracking data processing system according to claim 15, further including a plurality of auxiliary processor means connected to said control means for handling travel processing tasks assigned by said control means.

17. An air travel tracking data processing system according to claim 16, wherein one of said plurality of auxiliary processor means is coupled to said control means and to at least one modem and is dedicated to handling input-output processing tasks.

18. An air travel tracking data processing system according to claim 1 wherein said control means further includes control status word means including at least one control status word having a plurality of bit positions, each bit position being indicative of a predetermined travel related status condition, said control means including means for controlling the program execution sequence depending upon the state of said at least one control status word.

19. An air travel tracking data processing system according to claim 18, wherein said means for updating said entered travel related data for maintaining cumulative travel related data includes means for setting bit positions in said at least one control status word.

20. An air travel tracking data processing system according to claim 18, wherein said at least one control status word reflects the rate of growth of funds associated with a client account.

21. An air travel tracking data processing system according to claim 18, wherein each of said client account files including means for storing data reflecting the amount of funds available for travel, and wherein each client file further includes means for storing the active control states of said at least one control status word.

22. An air travel tracking data processing system according to claim 18, wherein said data entry means includes an associated means for displaying, and wherein said control means including means for controlling the display to display the control states of said at least one control status word.

23. An air travel tracking data processing system according to claim 18, wherein said at least one control status word includes at least one bit position which identifies a predetermined error condition.

24. An air travel tracking data processing system according to claim 1, wherein said memory means includes a plurality of data arrays, wherein said control means includes means for retrieving the same travel related data from more than one of said data arrays.

25. An air travel tracking data processing system according to claim 1, further including a plurality of data arrays for storing said travel related data, said data arrays including a current month data array for storing travel data entered during the current month and a previous month data array for storing travel data entered during the immediately preceding month, said means for updating including means for shifting data from the current month data array to the previous month data array and for thereafter loading the current months data into the current month data array.

26. An air travel track data processing system according to claim 1, further including means for retrieving from said memory means a plurality of said client account files; and means, responsive to said means for retrieving, for storing in a separate file in said memory means cumulative travel related data from each of said client account files.

27. A method of operating an air travel tracking data processing system having a data entry means for entering travel related data, memory means for storing said data and processing means for processing said travel related data, said method comprising the steps of:
   entering air travel related data including travel usage data and client identification data via said data entry means;
   associating said entered air travel related data with a corresponding one of a plurality of client account files in accordance with said client identification data;
   updating any previously entered air travel related data to maintain cumulative travel related data in each of said account files;
   storing in each of said client account files an indication of the amount of travel funds available;
   storing in each account investment growth related data; and
   periodically updating said indication of the amount of travel funds available in accordance with at least said investment growth related data.

28. A method according to claim 27, further including the steps of:
   entering initial investment base related data associated with said accounts; and
   updating said investment base related data in said account files as a function of travel usage.

29. A method according to claim 28, wherein the step of updating said investment data is further responsive to prevailing interest rate data.

30. A method according to claim 28, further including the step of determining threshold account balances necessary to achieve a predetermined return on the initial investment base and storing in said account files indicia related to achievement of a predetermined return on the initial investment base.

31. A method according to claim 30, wherein said indicia related to achievement of a predetermined rate of return includes data generated as a function of the period of time over which a client is scheduled to participate in the travel program.

32. A method according to claim 28, further including the steps of:
   monitoring client account investment base fluctuations over time; and
   determining the current client account progress towards achieving a predetermined investment return.

33. A method according to claim 32, further including the steps of:
   storing in at least one of said client account files indicia responsive to prevailing interest rates and travel usage;
   determining the amount of funds by which the client investment base is to be modified based on said factors; and
   determining, in response to both travel usage and prevailing interest rates, the amount of funds to be deposited or withdrawn from at least one separate account, whereby associated company account balance are varied depending upon client account performance.

34. A method according to claim 28, further including the steps of:
   monitoring the updated investment base related data associated with at least one of said client account files; and
   comparing said data with predetermined growth rate threshold related indicia.

35. A method according to claim 34, further including the step of updating the account investment base indicia in response to said comparing step.

36. A method according to claim 27, wherein said entering step includes entering participation time period related data defining a predetermined length of time a client is scheduled to participate in the travel program.

37. A method according to claim 27, wherein said entering air travel related data step includes entering a client travel request, said method further including the steps of:
   selectively granting said travel request; and
   decrementing said amount of travel funds available if said travel request is granted.

38. A method according to claim 37, wherein said step of selectively granting includes verifying the clients'identification.

39. A method according to claim 37, wherein said step of selectively granting includes the step of analyzing the travel request and projecting what the client account status will be as of the end of a predetermined time period if the request were to be granted.

40. A method according to claim 39, wherein said analyzing and projecting step includes the step of comparing data relating to a client's actual travel usage with threshold data targeted to guarantee a predetermined return of investment.

41. A method according to claim 27, wherein said data entry means includes a keyboard and a display means, and wherein said entering step includes entering by a keyboard operator, travel related data received via a telephone line.

42. A method according to claim 27, wherein said data processing system further includes at least one modem and terminal means connected to said memory means via said at least one modem wherein said entering step includes the step of entering travel related data into said memory means by using said terminal means to transmit data via said at least one modem.

43. A method according to claim 42, wherein said data processing system further includes a plurality of auxiliary processor means coupled to said memory means, said method further including handling predetermined travel processing tasks by one of said auxiliary processor means as assigned by said processing means.

44. A method according to claim 43, wherein one of said plurality of auxiliary processor means is coupled to at least one modem and further including the step of dedicating said one of said plurality of auxiliary processor means to handling input-output processing tasks.

45. A method according to claim 27, wherein said control means further includes control status word means including at least one control status word having a plurality of bit positions, each bit position being indicative of a predetermined travel related status condition, wherein said method further includes the step of controlling the processing means program execution sequence depending upon the state of said at least one control status word.

46. A method according to claim 45, wherein said step of maintaining cumulative travel related data includes the step of setting bit positions in said at least one control status word.

47. A method according to claim 45, wherein said at least one control status word reflects the rate of growth of funds associated with a client account.

48. A method according to claim 45, including the steps of storing data reflecting the amount of funds available for travel in each of said client account files and storing the active control states of said at least one control status word in each of said client account files.

49. A method according to claim 45, wherein said data entry means includes an associated means for displaying, said method further including controlling the display to display the control states of said at least one control status word.

50. A method according to claim 45, further including the step of dedicating at least one control status word for identifying a predetermined error condition.

51. A method according to claim 27, wherein said memory means includes a plurality of data arrays, said method further including loading travel related data in said arrays such that the same travel related data may be retrieved from more than one of said data arrays.

52. A method according to claim 27, further including a plurality of data arrays for storing travel related data, said data arrays including a current month data array for storing travel data entered during the current month and a previous month data array for storing travel data entered during the immediately preceding month, said method including the steps of shifting data from the current month data array to a previous month data array and thereafter loading the current month's data into the current month data array to thereby update the contents of the plurality of data arrays.

53. A method according to claim 27, furhter indicating the steps of:
retrieving from said memory means a plurality of said client account files; and
storing in a separate file in said memory means cumulative travel related data from each of said retrieved client account files.

54. An air travel tracking data processing system comprising:
data entry means for entering air travel related data including a client account number and travel cost indicia;
memory means for storing travel related data in a plurality of account files, each of which is accessible by an associated client account number;
processing means responsive to interest rate data and to said travel cost indicia for retrieving the client account file identified by said client account number and for determining an updated amount of funds available for travel in said retrieved client account file; and
means for storing said updated amount of funds available in said client account file.

55. An air travel tracking data processing system according to claim 54, wherein said data entry means includes means for entering initial investment base related data associated with said accounts, said processing means including means for updating said investment related data in said account files as a function of travel usage.

56. An air travel tracking data processing system according to claim 55, wherein said processing means includes means for monitoring client account investment base fluctuations over time and for determining the current client account progress towards achieving a predetermined investment return.

57. An air travel tracking data processing system according to claim 56, further including means for storing indicia responsive to prevailing interest rates and travel usage for determining the amount of funds by which the client investment base is to be incremented and for determining the amount of funds targeted for a separate account, whereby an associated company account may be varied depending upon the client account performance.

58. An air travel tracking data processing system according to claim 55, further including means for monitoring the updated investment base related data associated with at least one of said client account files and for comparing said data with predetermined growth rate threshold related indicia.

59. An air travel tracking data processing system according to claim 58, further including means responsive to said comparison for updating and modifying the account investment base indicia of at least one of said client account files.

60. An air travel tracking data processing system according to claim 54, wherein said means for entering air travel related data includes means for entering a client travel request;
said processing means including means for selectively granting said travel request; and
means responsive to said means for selectively granting for decrementing said amount of travel funds available.

61. An air travel tracking data processing system according to claim 60, wherein said means for selectively granting includes means for analyzing the travel request and for projecting what the client account status will be as of the end of a predetermined time period if the request is granted.

62. An air travel tracking data processing system according to claim 54, wherein said data processing system further includes at least one modem and said data entry means includes terminal means connected to said memory means via said at least one modem.

63. An air travel tracking data processing system according to claim 62, further including a plurality of auxiliary processor means for handling travel processing tasks assigned by said processing means.

64. An air travel tracking data processing system according to claim 54, wherein said processing means further includes control status word means including at least one control status word having a plurality of bit positions, each bit position being indicative of a predetermined travel related status condition, said processing means including means for controlling the program execution sequence depending upon the state of said at least one control status word.

65. An air travel tracking data processing system according to claim 64, wherein each client file further includes means for storing the active control states of said at least control status word.

66. An air travel tracking data processing system according to claim 64, wherein said data entry means includes an associated means for displaying, and wherein said processing means including means for controlling the display to display the control states of said at least one control status word.

67. An air travel tracking data processing system according to claim 54, wherein said memory means includes a plurality of data arrays, wherein said processing means includes means for accessing the same travel related data from said data arrays based on any one of a plurality of indices.

68. An air travel tracking data processing system according to claim 54, further including a plurality of data arrays for storing travel related data, said data arrays including a current month data array for storing travel data entered during the current month and a previous month data array for storing travel data entered during the immediately preceding month, said means for updating including means for shifting data from the current month data array to the previous month data array and for thereafter loading the current months data into the current month data array.

69. An air travel track data processing system according to claim 54, further including means for retrieving from said memory means a plurality of said client account files; and means, responsive to said means for retrieving, for storing in a separate file, in said memory means cumulative travel related data from each of said client account files.

70. An air travel tracking data processing system comprising:

data entry means for entering at least air travel related data;

memory means for storing said air travel related data in a plurality of client account files, each of which stores travel related data including travel usage data and an indication of the amount of funds available for travel;

processing means for at least periodically updating the travel related data in each of said client account files, said processing means including control status word means including at least one control status word having a plurality of bit positions, each bit position having a control state indicative of a predetermined status condition, said at least one control status word reflecting the rate of growth of the amount of funds available for travel in a client's account;

said means for periodically updating including means for checking the control state of said at least one control status word and for updating the travel related data in at least one of said client account files as a function of said control state.

71. An air travel tracking data processing system according to claim 70, said processing means including means for maintaining cumulative travel related data for each of said client account files; and means for setting bit positions in said at least one control status word in response to said travel related data.

72. An air travel tracking data processing system according to claim 70, wherein each client file further includes means for storing the active control state of said at least one control status word.

73. An air travel tracking data processing system according to claim 70, wherein said data entry means includes an associated means for displaying, and wherein said processing means includes means for controlling the display to display the control states of said at least one control status word.

74. An air travel tracking data processing system according to claim 70, wherein said at least one control status word includes at least one bit which identifies a predetermined error condition.

* * * * *